US012711421B2

(12) United States Patent
Vegas Santiago et al.

(10) Patent No.: US 12,711,421 B2
(45) Date of Patent: Aug. 18, 2026

(54) WORKFLOW PREDICTIVE ANALYTICS ENGINE

(71) Applicant: GE Precision Healthcare LLC, Wauwatosa, WI (US)

(72) Inventors: Manuel Vegas Santiago, Madrid (ES); Vamsee Krishna Rangavajhala, Wauwatosa, WI (US); Ezra Nathaniel Ojeda Rodriguez, Wauwatosa, WI (US); Edward H. Lail, Wauwatosa, WI (US); Georgios Spanos, Freiburg (DE)

(73) Assignee: GE Precision Healthcare LLC, Wauwatosa, WI (US)

( * ) Notice: Subject to any disclaimer, the term of this patent is extended or adjusted under 35 U.S.C. 154(b) by 419 days.

(21) Appl. No.: 17/856,681

(22) Filed: Jul. 1, 2022

(65) Prior Publication Data

US 2022/0335339 A1 Oct. 20, 2022

Related U.S. Application Data

(63) Continuation-in-part of application No. 16/691,098, filed on Nov. 21, 2019, now Pat. No. 11,380,436, (Continued)

(51) Int. Cl.

*G06N 20/20* (2019.01)
*G06N 5/04* (2023.01)
*G06N 20/00* (2019.01)

(52) U.S. Cl.

CPC ............... *G06N 20/00* (2019.01); *G06N 5/04* (2013.01)

(58) Field of Classification Search

CPC ................................ G06N 20/00; G06N 5/04

(Continued)

(56) References Cited

U.S. PATENT DOCUMENTS 7,693,735 B2 4/2010 Carmi et al.
8,027,849 B2 * 9/2011 Johnson ................. G16Z 99/00 705/2

(Continued)

FOREIGN PATENT DOCUMENTS

CN 1842788 A 10/2006
CN 109631935 A 4/2019

(Continued)

OTHER PUBLICATIONS

EP application 23178884.5 filed Jun. 13, 2023—extended Search Report issued Nov. 14, 2023.

(Continued)

*Primary Examiner* — Michael Tomaszewski

(57) ABSTRACT

Systems, methods, and apparatus to generate and utilize predictive workflow analytics and inferencing are disclosed and described. An example apparatus includes memory circuitry including instructions and a plurality of artificial intelligence (AI) models; and processor circuitry to execute the instructions to implement at least: a smart scheduling engine to train at least one of the plurality of AI models, update at least one of the plurality of AI models, and inference a prediction using at least one of the plurality of AI models; and a smart scheduling application programming interface (API) to facilitate interaction with at least one of the plurality of AI models to trigger the prediction and to configure resources for an appointment based on the prediction.

20 Claims, 28 Drawing Sheets

Related U.S. Application Data which is a continuation-in-part of application No. 16/456,656, filed on Jun. 28, 2019, now Pat. No. 11,309,076.

(60) Provisional application No. 62/770,548, filed on Nov. 21, 2018.

(58) Field of Classification Search
USPC .......................................................... 705/2–3
See application file for complete search history.

(56) References Cited

U.S. PATENT DOCUMENTS 8,229,761 B2* 7/2012 Backhaus .............. G06Q 10/06 705/2
8,515,777 B1* 8/2013 Rajasenan .............. G16H 50/30 705/7.14
8,612,250 B2* 12/2013 Backhaus .............. G16H 30/40 705/2
8,799,009 B2 8/2014 Mellin et al.
8,849,689 B1 9/2014 Jagannathan et al.
9,303,997 B2 4/2016 McGavran et al.
11,309,076 B2 4/2022 Vegas Santiago et al.
11,380,436 B2* 7/2022 Vegas Santiago ..... G16H 40/20
2005/0256745 A1 11/2005 Dalton
2007/0136118 A1* 6/2007 Gerlach ........... G06Q 10/06315 705/7.22
2007/0203761 A1* 8/2007 Keen ...................... G16H 20/40 705/5
2007/0226010 A1 9/2007 Larsen
2007/0239636 A1 10/2007 Tang et al.
2007/0300220 A1* 12/2007 Seliger .................. H04L 63/168 718/1
2008/0091474 A1* 4/2008 Ober ................... G06F 21/6254 705/3
2009/0164236 A1 6/2009 Gounares et al.
2009/0323021 A1* 12/2009 Uchida .................... A61B 3/12 351/206
2010/0106517 A1* 4/2010 Kociubinski .......... G16H 40/20 705/2
2011/0215933 A1 9/2011 Darling, IV et al.
2012/0035945 A1* 2/2012 Jain ........................ G16H 10/60 705/2
2012/0065987 A1* 3/2012 Farooq ................... G16H 50/70 705/2
2012/0173259 A1* 7/2012 Amberg ........... G06Q 10/06314 705/2
2013/0262357 A1* 10/2013 Amarasingham ...... G16H 50/70 706/21
2014/0074509 A1* 3/2014 Amarasingham ...... G16H 50/70 705/3
2014/0095181 A1 4/2014 Johnson et al.
2014/0108045 A1* 4/2014 Afshar ................... G16H 40/63 705/3
2014/0136264 A1 5/2014 Kinsey, II
2014/0236627 A1 8/2014 Odessky et al.
2014/0257903 A1* 9/2014 Herscovici ......... G06Q 10/1093 705/7.19
2014/0278496 A1* 9/2014 Spencer ................. G16H 40/20 705/2
2014/0343955 A1 11/2014 Raman
2014/0365107 A1 12/2014 Dutta et al.
2015/0106123 A1* 4/2015 Amarasingham ...... G16H 10/60 705/3
2015/0213202 A1* 7/2015 Amarasingham ....... G16Z 99/00 705/2
2015/0213206 A1* 7/2015 Amarasingham ...... G16H 50/30 705/2
2015/0213207 A1* 7/2015 Amarasingham ...... G16H 50/50 705/2
2015/0213217 A1* 7/2015 Amarasingham ...... G16H 50/30 705/2
2015/0213222 A1* 7/2015 Amarasingham ...... G16H 50/30 705/2
2015/0213223 A1* 7/2015 Amarasingham ...... G16H 50/30 705/2
2015/0213224 A1* 7/2015 Amarasingham ...... G16H 50/30 705/2
2015/0213225 A1* 7/2015 Amarasingham ...... G16H 50/30 705/2
2015/0242819 A1 8/2015 Moses et al.
2016/0019666 A1* 1/2016 Amarasingham ...... G16H 40/67 705/3
2016/0253462 A1* 9/2016 Zhong .................... G06Q 10/06 705/2
2016/0292369 A1* 10/2016 Lakare .................... G16Z 99/00
2017/0024523 A1* 1/2017 Gutfraind ............. G16H 40/20
2017/0061093 A1* 3/2017 Amarasingham ...... G16H 10/60
2018/0039742 A1 2/2018 Zhong et al.
2018/0150603 A1* 5/2018 Bullington ............. G16H 40/20
2019/0304596 A1* 10/2019 Padala ................... G16H 40/20
2020/0160984 A1* 5/2020 Vegas Santiago ..... G16H 40/20
2020/0160986 A1* 5/2020 Vegas Santiago ..... G16H 40/20
2022/0335339 A1* 10/2022 Vegas Santiago ..... G06N 3/096
2024/0331070 A1* 10/2024 Ahrens .................. G06Q 50/22

FOREIGN PATENT DOCUMENTS

WO WO-2009086213 A2 * 7/2009 ............. G16H 40/20
WO WO-2014071023 A1 * 5/2014 ............. G06N 20/00
WO 2016135587 A1 9/2016

OTHER PUBLICATIONS

International Searching Authority, "Search Report and Written Opinion," issued in connection with International Patent Application No. PCT/IB2016/050835, mailed May 11, 2016, 8 pages.

O'Hare "The Outcomes of Open-Access Scheduling," Fam Pract Manag. Feb. 2004; 11(2):35-38, retrieved from https://www.aafp.org/fpm/2004/0200/p35.html, on Jul. 16, 2019, 4 pages.

United States Patent and Trademark Office, "Non-Final Office Action," issued in connection with U.S. Appl. No. 15/045,721, mailed on Dec. 31, 2018, 32 pages.

Michele Samoran, "Outpatient appointment scheduling given individual day-dependent no-show predictions", vol. 240, Issue 1, Jan. 1, 2015, Abstract only, retrieved from https://www.sciencedirect.com/science/article/abs/pii/S0377221714005372?via%3Dihub, on Jun. 28, 2019., 2 pages.

United States Patent and Trademark Office, "Final Office action," issued in connection with U.S. Appl. No. 15/045,721, mailed on Jun. 26, 2019, 37 pages.

United States Patent and Trademark Office, "Non-Final Rejection," issued Sep. 16, 2021 in connection with U.S. Appl. No. 16/691,098, 16 pages.

United States Patent and Trademark Office, "Notice of Allowance and Fee(s) Due," issued Mar. 1, 2022 in connection with U.S. Appl. No. 16/691,098, 8 pages.

O'Hare, et al., "The Outcomes of Open-Access Scheduling," Family Practice Management Web site, available at [www.aafp.org/fpm], 2004, 4 pages.

Chiara Anna Parente et al., "Using overbooking to manage no-shows in an italian healthcare center," BMC health services research, vol. 18, No. 1, Mar. 15, 2018, 12 pages.

International Searching Authority, "Search Report and Written Opinion," issued Mar. 3, 2020 in connection with International Patent Application No. PCT/US2019/062522, 13 pages.

United States Patent and Trademark Office, "Notice of Allowance and Fee(s) Due," issued Dec. 13, 2021 in connection with U.S. Appl. No. 16/456,656, 9 pages.

United States Patent and Trademark Office, "Non-Final Rejection," issued Jul. 16, 2021 in connection with U.S. Appl. No. 16/456,656, 22 pages.

* cited by examiner

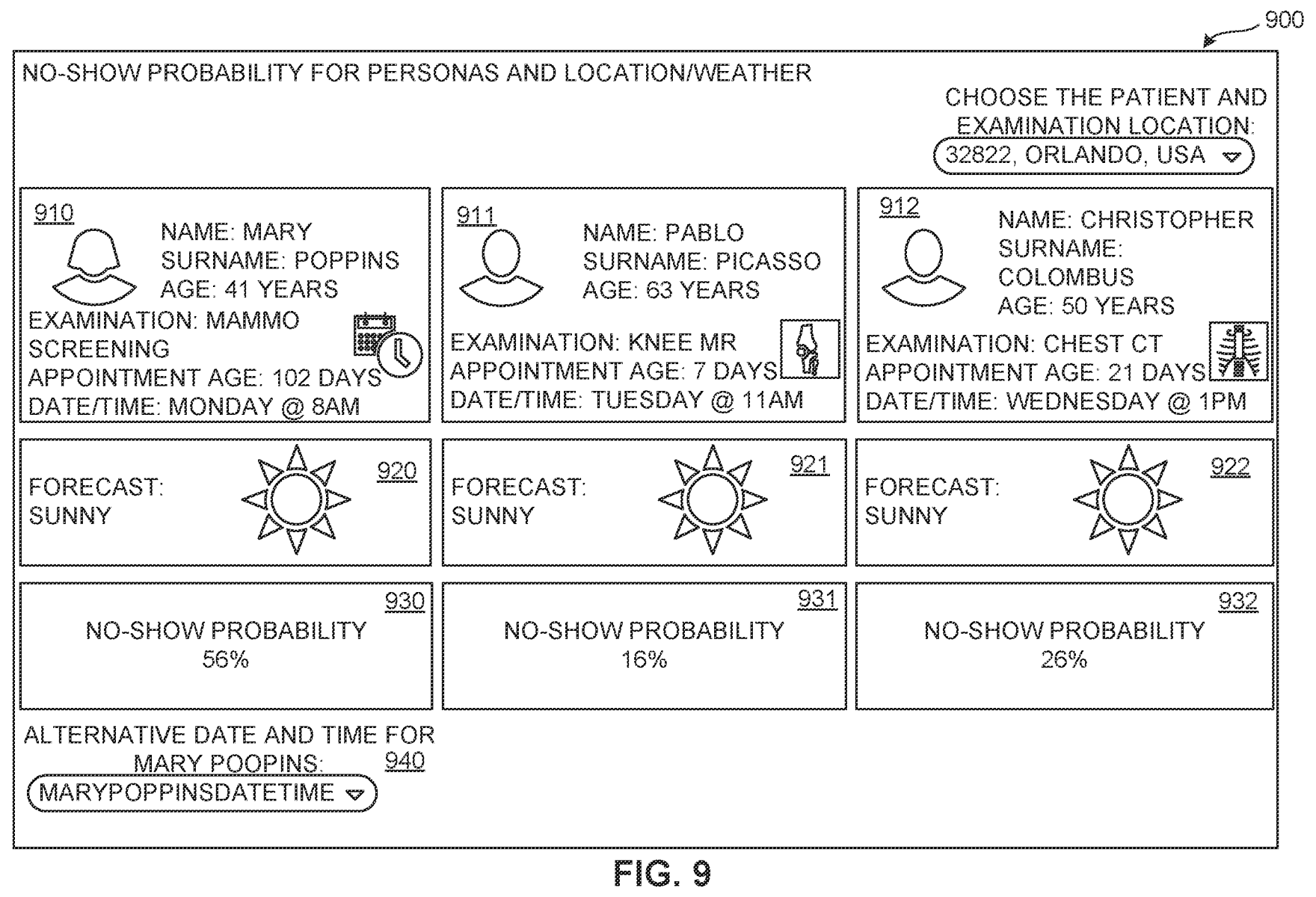

900

NO-SHOW PROBABILITY FOR PERSONAS AND LOCATION/WEATHER

CHOOSE THE PATIENT AND EXAMINATION LOCATION:
32822, ORLANDO, USA

910
NAME: MARY
SURNAME: POPPINS
AGE: 41 YEARS
EXAMINATION: MAMMO SCREENING
APPOINTMENT AGE: 102 DAYS
DATE/TIME: MONDAY @ 8AM

911
NAME: PABLO
SURNAME: PICASSO
AGE: 63 YEARS
EXAMINATION: KNEE MR
APPOINTMENT AGE: 7 DAYS
DATE/TIME: TUESDAY @ 11AM

912
NAME: CHRISTOPHER
SURNAME: COLOMBUS
AGE: 50 YEARS
EXAMINATION: CHEST CT
APPOINTMENT AGE: 21 DAYS
DATE/TIME: WEDNESDAY @ 1PM

920
FORECAST: SUNNY

921
FORECAST: SUNNY

922
FORECAST: SUNNY

930
NO-SHOW PROBABILITY 56%

931
NO-SHOW PROBABILITY 16%

932
NO-SHOW PROBABILITY 26%

ALTERNATIVE DATE AND TIME FOR MARY POOPINS: 940
MARYPOPPINSDATETIME

FIG. 9

| PREDICTION / REAL | SHOW | NO SHOW |
|---|---|---|
| SHOW | 14905 | FALSE POS.: 24 |
| NO SHOW | MISSED: 50 | 238 |

90.8% PRECISION 82.6% RECALL

WORKFLOW PREDICTIVE ANALYTICS ENGINE

CROSS-REFERENCE TO RELATED APPLICATION

This patent arises from U.S. patent application Ser. No. 16/691,098, which was filed on Nov. 11, 2019, U.S. patent application Ser. No. 16/456,656, which was filed on Jun. 28, 2019, and U.S. Provisional Patent Application Ser. No. 62/770,548, which was filed on Nov. 21, 2018. U.S. patent application Ser. No. 16/691,098 is hereby incorporated herein by reference in its entirety. Priority to U.S. patent application Ser. No. 16/691,098 is hereby claimed. U.S. patent application Ser. No. 16/456,656 is hereby incorporated herein by reference in its entirety. Priority to U.S. patent application Ser. No. 16/456,656 is hereby claimed. U.S. Provisional Patent Application Ser. No. 62/770,548 is hereby incorporated herein by reference in its entirety. Priority to U.S. Provisional Patent Application Ser. No. 62/770,548 is hereby claimed.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE DISCLOSURE

This disclosure relates generally to improved medical systems and, more particularly, to improved workflow predictive analytics engine systems and associated methods.

BACKGROUND

The statements in this section merely provide background information related to the disclosure and may not constitute prior art.

Healthcare environments, such as hospitals or clinics, include information systems, such as hospital information systems (HIS), radiology information systems (RIS), clinical information systems (CIS), and cardiovascular information systems (CVIS), and storage systems, such as picture archiving and communication systems (PACS), library information systems (LIS), and electronic medical records (EMR). Information stored can include patient medication orders, medical histories, imaging data, test results, diagnosis information, management information, and/or scheduling information, for example. A wealth of information is available, but the information can be siloed in various separate systems requiring separate access, search, and retrieval. Correlations between healthcare data remain elusive due to technological limitations on the associated systems.

Further, when data is brought together for display, the amount of data can be overwhelming and confusing. Such data overload presents difficulties when trying to display, and competing priorities put a premium in available screen real estate. Existing solutions are deficient in addressing these and other related concerns.

BRIEF DESCRIPTION OF DRAWINGS

FIGS. 9-14 depict example interfaces generated by the example systems and methods of FIGS. 1-8.

DETAILED DESCRIPTION

Figure 1:
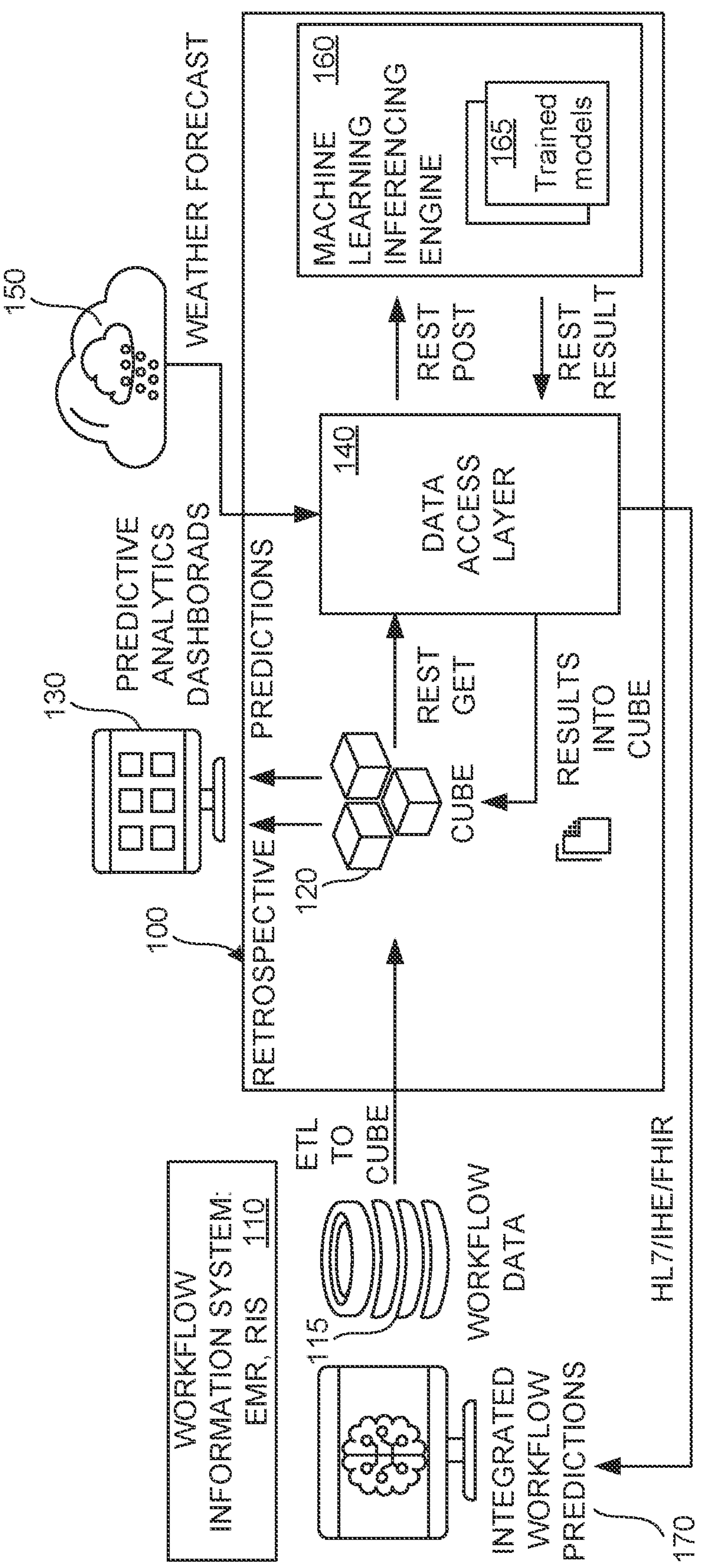
FIG. 1 illustrates an example predictive analytics inferencing architecture.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms “comprising,” “including,” and “having” are intended to be inclusive and mean that there may be additional elements other than the listed elements. As the terms “connected to,” “coupled to,” etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, the terms “system,” “unit,” “module,” “engine,” etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

In addition, it should be understood that references to “one embodiment” or “an embodiment” of the present disclosure are not intended to be interpreted as excluding the existence of additional embodiments that also incorporate the recited features.

Certain examples change the paradigm of clinical system interaction and patient scheduling for more intelligent resource utilization and improved patient access. A scheduled exam without a patient results in a delay to diagnosis, idle staff, underutilized equipment, and missed opportunity. Certain examples address these problems through new systems, improved analyses, and added interactions between systems to identify and close holes in current operational processes and predictions.

Patient access is the foundation for care. In imaging, for example, patient access starts with timely examination. Without timely examination, imaging and analytics systems do not have data to evaluate a patient, determine a condition, and generate (or assist in generating) treatment. However, patients experience barriers to such examination that current systems and associated approaches have not overcome. For example, a schedule backlog means that patients may have to wait days, weeks, or even months to get an exam. Patients may also forget or be forced to skip appointments due to conflicts. Logistical concerns, such as distance, weather, etc., impact timeliness for exams as well as whether patients are able to arrive at all.

Aspects disclosed and described herein provide systems and associated methods to provide predictive analytics including customer-driven workflow predictions and corresponding responsive actions. For example, predictive analytics disclosed and described herein can be used to avoid breaches in service level agreement (SLA) with respect to reporting, etc., by providing a real-time reporting worklist at a point of decision (e.g., in a radiology information system (RIS), etc.) along with a probability of breach. In another example, patient no-shows can be prevented by identifying examinations having a high probability of no-show and triggering a corrective action such as a reminder, an overbooking analysis, a ride sharing assist, etc., as disclosed and described herein. In another example, patient waiting time can be predicted to improve patient experience and revenue opportunity by computing and announcing an estimated waiting time as disclosed and described herein. In another example, workload and capacity can be managed by planning strategically on a machine and reporting resources needed for each service as disclosed and described herein.

For example, patient no-shows for radiology appointments can be predicted using historical patterns and artificial intelligence processing of patient information (e.g., age, gender, history, etc.), appointment age (e.g., how long since the appointment was made, etc.), date/time of appointment, weather forecast, other historical pattern data, etc. Certain examples leverage artificial intelligence (AI) such as a random forest, artificial neural network (such as a convolutional neural network (CNN), etc.), etc., to provide an integrated prediction and corrective action framework to address likely patient no-show. Patient no shows are costly (e.g., ~$1 M loss in yearly opportunity for magnetic resonance imaging exams at a 4% patient no-show rate). A machine learning algorithm and associated model can factor in elements such as weather forecast, location, time, traffic, etc., to predict likely patient no-shows, and a reduced in no-shows increases responsiveness to patient health needs, increased productivity in a healthcare environment, increased revenue, etc., through algorithm-based reconfirmation/replacement strategies, for example.

Certain examples leverage weather data, a history of no-shows for the patient and/or exam, examination type, examination parameter(s), and appointment-specific predictors to train (and re-train/update) an AI model and conduct inferencing with the AI model based on site, exam, and/or patient tendencies. Certain examples provide AI model development with high accuracy. Utilizing machine learning models leveraging a wide range of factors, both internal and external, manages the challenges associated with scheduling and missed (opportunities for) appointments and changes scheduling infrastructure and associated workflows. For example, no-show rates as high as 6.5% can be reduced up to 70% using systems and methods disclosed herein.

Certain examples can be customized to a particular local, type of examination, etc. Examinations can be evaluated by modality, procedure type, request to schedule date, etc., and compares a predicted probability score based on whether the patient attends or misses the exam. Certain examples provide apparatus and methods that utilize data collected from one or more Electronic Medical Record (EMR), Hospital Information System (HIS), Radiology Information System (RIS), etc. Non-health data such as weather forecast data, traffic data, holiday data, other interruption, etc., is then integrated into a common data warehouse, which is used to train a smart scheduling algorithm using any one of several machine learning models selected based on customer workflow, architecture, etc. Information is then displayed and otherwise output to another system and/or process to show a patient probability score and other information included in the scheduling analysis that is relevant to the particular scheduler. In certain examples, utilized data and resulting output remain on-premise so as to maintain personal and health data privacy.

FIG. 1 illustrates an example predictive analytics inferencing architecture 100. The example apparatus 100 includes and/or interacts with one or more workflow information systems 110, such as an electronic medical record (EMR) system, radiology information system (RIS), picture archiving and communication system (PACS), etc. The information system(s) 110 provide healthcare workflow data 115 to a data store 120, such as an ElastiCube, other data cube, other data store, etc. The workflow data 115 can related to a schedule or workflow of activities involving patients, resources, personnel, etc., for a healthcare facility, for example. The workflow data 115 can be mined using extract, transform, and load (ETL) operations to provide the data 115 to the storage 120, for example. The data storage 120 provides the data to a predictive analytics dashboard 130 as well as a data access layer 140. The dashboard 130 can display prediction(s) from the data 115, for example. The data access layer 140 receives data from the data store 120 (e.g., via a Representational State Transfer (REST) get request, etc.) and combines the data with additional information such as weather forecast information 150 (traffic information, non-healthcare event information, etc.). The data access layer 140 combines the healthcare data 115, such as appointment data, patient data, hospital resource data, etc., with weather forecast information 150 (e.g., looking at a 5-day window around the time of the appointment, etc.) and/or other information such as location, traffic, etc., to form combined, enriched healthcare workflow data, and provides the combined, enriched information (e.g., via a REST post operation, etc.) to a machine learning inferencing engine 160, which includes one or more AI models 165 to process the information and generate a prediction, for example. Results are provided (e.g., via a REST result operation, etc.) back to the data access layer 140 to be conveyed to the data store 120 as well as to the information system(s) 110 as one or more integrated workflow predictions 170.

Thus, data can be aggregated and processed by one more machine learning algorithms implemented using models 165 (e.g., random forest, CNN, etc.) to provide predictive output 170 to the information system(s) 110. The algorithm can change based on a goal of the analysis, degree of probability estimation, accuracy, priority, etc. The example dashboard 130 can provide both predictive and retrospective visualization(s) of information, such as prediction of one or more patient no-shows, etc. In certain examples, a confidence interval can be provided with the predictive estimate. For example, using the prediction of a patient no-show and an associated confidence interval or score (e.g., 90%, 50%, 30%, etc.), the system 110 can decide whether it wants to make an adjustment or change to that patient's appointment (e.g., a reminder, a confirmation, a replacement or substitution of that time slot and associated resource(s), etc.). The confidence interval can be a confidence in the prediction based on available information, and/or the confidence interval can be an indication of confidence that the patient will show up for his/her scheduled appointment, for example.

For example, the prediction can analyze the schedule three days in advance to identify patient(s) associated with a low confidence interval (e.g., <50%), then follow-up with them to confirm whether or not they will be showing up. While rescheduling on the same day is difficult, the schedule can be adjusted up to one day in advance to accommodate a patient who will not or is not likely to attend his/her scheduled appointment. In certain examples, a more urgent patient can be scheduled in place of a patient with a low likelihood of attendance. If a patient is not likely to attend, degradable materials such as nuclear medicine isotopes can be saved, postponed, used instead for another patient, etc., rather than going to waste because the half-life does not allow storage for delayed use.

In certain examples, the output 170 can include a worklist with an indication of confidence/likelihood in attendance/no show, etc. In certain examples, the worklist is generated for follow-up, and patients on the list are prioritized or ranked based on their priority, their likelihood of no show, and available capacity when the list is too long to follow up with everyone.

In certain examples, the worklist can be processed by looking for patients with a same or similar procedure scheduled in the next month to see if a slot can be filled with someone else if the patient currently in that slot does not make his/her appointment. In certain examples, patient address can be compared to clinic location and combined with traffic information to priority patient(s) who can more easily make it to the hospital to fill a time slot.

In certain examples, the data store 120 transforms the data 115 before providing the data to the data access layer 140 and inferencing engine 160. For example, the data store 120 can transform a format of the data 115, can organize/arrange the data 115, etc. Thus, data 115 can be transformed from the RIS to generate a priority list, for example. The model 165 provides output to the data store 120 to be used by the dashboard(s) 130 to present predictive results. The data store 120 can transform the output from the model(s) 165 of the inferencing engine 160 to form a predictive dashboard display 130, for example. Thus, data modeled in the data store 120 (e.g., cleaned, standardized/normalized/transformed, and prepared for output, etc.) can be used to train model(s) 165 and generate prediction(s), for example. The data store 120 can be configured to select a particular subset of the data 115, rather than all the data 115, from the information system(s) 110 that matches certain constraint(s), criterion(-ia), etc., and the data store 120 can organize that data in a certain way for the dashboard(s) 130, model(s) 165, etc.

The model(s) 165 are trained using the prepared data from the data store 120 as further combined with other information such as weather 150, traffic, etc., via the data access layer 140. The data and constraints train, test, and transform the model(s) 165 into particular algorithms customized for the specific data set(s) 115 and observed patient pattern(s) for the particular healthcare environment's system(s) 110. Thus, the model(s) 165 become a customized algorithm or set of algorithms that function for a particular environment, scenario, set of resources, patient population, etc.

In certain examples, the data access layer 140 can send results to the relevant system(s) 110, such as a RIS, PACS, EMR, etc., and appointments can be directly flagged in the RIS scheduling system with a high probability of no-show. Action can be taken to confirm those appointments, cancel or reschedule those appointments, fill in empty time slots with other available patients, etc.

Figure 2:
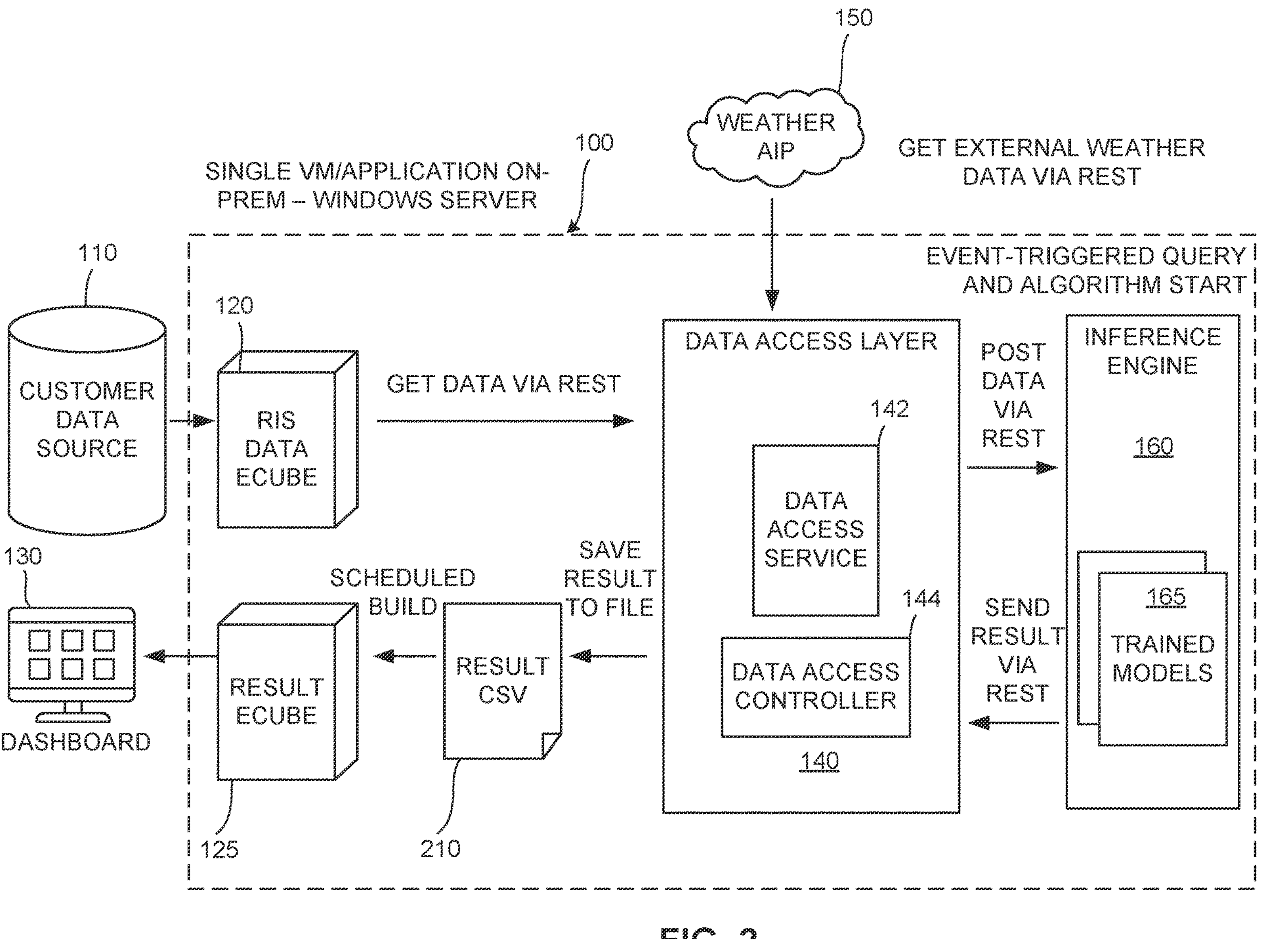
FIG. 2 illustrates a more detailed view of an implementation of the example architecture of FIG. 1.

FIG. 2 illustrates a more detailed view of an implementation of the example architecture 100. In the example of FIG. 2, the architecture 100 is implemented as a virtual machine or appliance running at a healthcare facility (e.g., a hospital, clinic, doctor's office, etc.). In the example implementation of FIG. 2, the data store 120 is divided into a MS data cube 120 and a result cube 125, and the data access layer 140 includes a data access service 142 and a data access controller 144. The data access layer 140 provides a result that is saved in a result file 210, which is provided to the result cube 125. The scheduled build of predictive results from the result file 210 can be used to drive the dashboard 130 interface display(s) and associated action(s).

As shown in the example of FIG. 2, an event at a workflow information system 110 triggers (e.g., based on an appointment or scheduling request, daily schedule generation, etc.) exchange of data and processing of event data, patient data, and other data (e.g., non-health data such as weather, traffic, resources, etc.) to generate an interactive dashboard display and schedule modification. The data cube 120 merges data from multiple sources and enables components of the system 100 to manipulate and query the data as if it was one consolidated data set. Using the cube 120, data from one or more sources 110 at one or more locations can based "mashed" together to represent data in fields in which a value in one field has a corresponding value in another field to enable data in a field to be processed with respect to data in any other field. By allowing data to be analyzed in the context of other data from the same or disparate data source, the cube 120 enables powerful query and analysis of large amounts of data from disparate data source(s) to be processed by the data access layer 140 in real time (or substantially real time given a data retrieval, storage, and/or processing latency, etc.).

In certain examples, the data 115 can be provided to the cube 120 via extract, transform, and load (ETL) operation(s). Using ETL, data 115 can be copied from a source in one context to a destination in another context. Thus, the ETL operation(s) process data retrieved from one or more source(s) 110, cleanse the data to remedy deficiency, inconsistency, etc., from an expected format and/or context, and transform the data into a format/context on which the data access layer 140 can act. In certain examples, ETL operation(s) on the data 115 form the data 115 into a comma separated value (CSV) file and/or other spreadsheet, data file, etc., for retrieval and processing by the data access layer 140.

In certain examples, the data access layer 140 creates a layer of abstraction between the data cube 120 and the inference engine 160. The abstraction of the data access layer 140 allows different logical models to be used with respect to data in the data cube 120 and processing via the inference engine 160 and its model(s) 165, for example. In certain examples, the data access layer 140 can include business logic to tailor queries of data via the data cube 120 and provide an incoming query of the data cube 120 (e.g., data gathered from the cube 120 via a REST get query, etc.) and an outgoing result for the result cube 125. As shown in the example of FIG. 2, the data access layer 140 includes a data access service 142 and a data access controller 144. The data access controller 144 regulates the data access service 142 to get and combine data, process the data, trigger inferencing by the inferencing engine 160, etc. The data access controller 144 can help ensure quality and quantity of data retrieved by the data access service 142 and can help ensure authentication and authorization to retrieve, combine, and process data, for example. For example, the data access controller 144 can control (e.g., via a hypertext transfer protocol (HTTP) request, etc.) the data access service 142 to gather patient and schedule data 115 as well as weather information 150 for a particular time/location to form an execution request for the inference engine 160.

Thus, the data access layer 140 receives data from the data store 120 (e.g., via a REST get request, etc.) and combines the data with additional information such as weather forecast information 150 (traffic information, non-healthcare event information, etc.). The data access layer 140 combines the healthcare data 115, such as appointment data, patient data, hospital resource data, etc., with weather forecast information 150 (e.g., looking at a 5-day window around the time of the appointment, etc.) and/or other information such as location, traffic, etc., and provides the combined information (e.g., via a REST post operation, etc.) to the machine learning inferencing engine 160, which includes one or more AI models 165 to process the information and generate a prediction, for example. The inference engine 160 trains and deploys AI model(s) 165 such as machine learning models (e.g., neural networks, etc.), etc., to process incoming data and determine a likely outcome such as a no-show prediction, etc. The model(s) 165 can be trained, for example, on prior, verified data indicating that certain patient conditions, weather, time/location, etc., result in a patient no-show for an appointment, for example. Results are provided (e.g., via a REST result operation, etc.) back to the data access layer 140 to be conveyed as an output, such as a CVS file 210, etc., to the result data cube 125 as well as to the information system(s) 110 as one or more integrated workflow predictions 170, for example.

Figure 3:
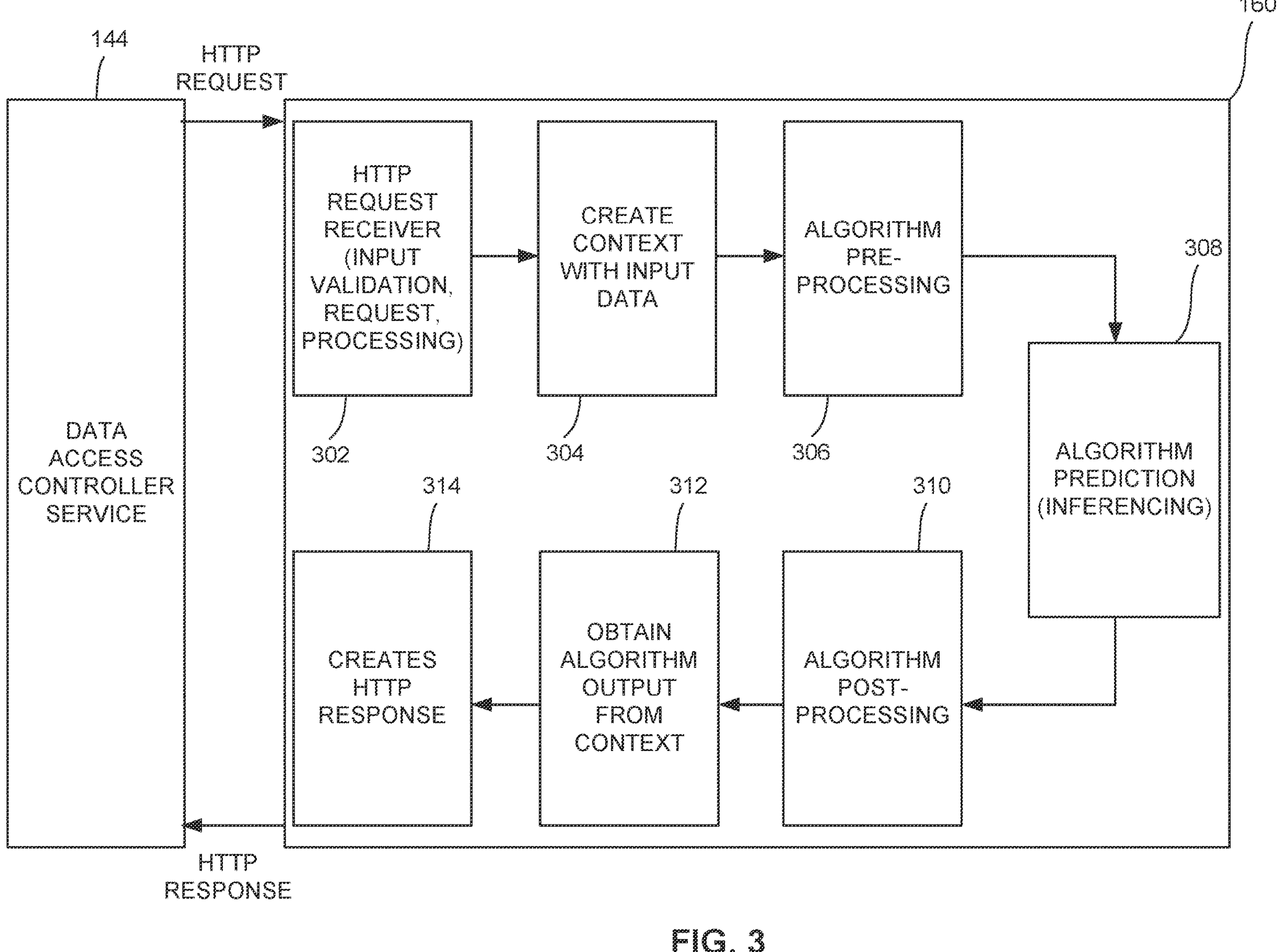
FIG. 3 depicts an example implementation of the inferencing engine of FIGS. 1-2.

FIG. 3 depicts an example implementation of the inferencing engine 160 of FIGS. 1-2. As shown in the example of FIG. 3, the inferencing engine 160 can be implemented as a container or virtual machine including a plurality of elements or actions 302-314. For example, the inferencing engine of FIG. 3 includes an HTTP request receiver 302 to perform input validation, request processing, etc. The receiver 302 provides the processed data to a context creator 304, which creates a patient/schedule context using the input data. For example, context such as reason for exam, patient condition, location, time, etc., can be associated with the data. The data with context is then provided to a preprocessing algorithm 306, which prepares the data for processing by the AI model(s) 165 to generate a prediction (e.g., a no-show prediction, an SLA breach prediction, a wait time prediction, a workload prediction, etc.). The prediction is then output to an algorithm postprocessor 310 to take the model 165 result(s) and formulate the result(s) for use in display, records, schedule adjustment, communication, other output, etc. The post-processed result(s) are provided an output contextualizer 312 to provide context (e.g., patient context, schedule context, etc.) to the output. The contextualized output is then provided to a response generator 314 to create a response (e.g., an HTTP response, etc.) to be send to the data access controller service 144 of the data access layer 140, for example.

Thus, the inferencing engine 160 is a framework component that provides connectivity and expansibility to accommodate one or more algorithm models 165, pre- and/or post-processing, and scalability to scale up algorithm(s) to support a workflow across one or more hospital departments, teams, etc. The engine 160 can scale predictive analytics in the model(s) 165 for a number of sources, number of recipients, intended audience/environment, etc. In certain examples, a variety of models 165 can be plugged in to the engine 160 depending on target goal/objective, patient population, healthcare environment, etc., the model(s) 165 are incorporated into the engine 160 transparent to the user and/or healthcare system 110. The engine 160 provides a framework to accept the algorithm model 165 and adapt that model 165 to a real world system 110, for example.

For example, the model 165 is unable to connect to other parts of the system 110, and the engine 160 connects the model 165 to the system 100, allows it to be changed, enables it to be used, etc. The framework of the engine 160 anchors the model 165 and establishes connections with other parts of the system 100. For example, data from which the prediction is made comes from the database/cubes 120, forwarded via the data management service of the access layer 140, and the inferencing engine 160 exposes an HTTP endpoint, for example, to receive the data and process the data to help ensure quality, format, etc. The pre-processed data is then forwarded to the model 165. Code executed by the engine 160 before the model 165 and after the model 165 preprocesses data going into the model 165 and post-processes data coming out of the model 165 to be used by the system 100 after the model 165.

In certain examples, the model 165 is generated as a random forest model. Random forests or random decision forests are an ensemble learning method for classification, regression and other tasks that operate by constructing a multitude of decision trees at training time and outputting a class that is a mode of included classes (classification) or a mean prediction (regression) of the individual trees, for example. Random decision forests correct for decision trees' habit of overfitting to their training set, for example. That is, decision tree structures can be used in machine learning, but, when the tree grows deep, the tree can learn irregular patterns, resulting in low bias but high variance as the decision tree overfits its training data set. Random forests average multiple deep decision trees, trained on different parts of the same training set, to reduce variance. The reduction in variance can come at the expense of a small increase in the bias and some loss of interpretability, but, generally, greatly boosts performance in the final model. Random forests can be used to rank importance of variables in a regression or classification problem, such as a likelihood or probability of patient no-shows, in a natural way.

In certain examples, random forest predictors can lead to a dissimilarity measure among observations. A random forest dissimilarity measure can also be defined between unlabeled data. A random forest dissimilarity can be used to process mixed variable types because it is invariant to monotonic transformations of the input variables and is robust to outlying observations. The random forest dissimilarity accommodates a large number of semi-continuous variables due to its intrinsic variable selection. For example, a random forest dissimilarity can be used to weigh a contribution of each available variable according to how dependent the variable is on other variables. The random forest dissimilarity can be used to identify a set of patient(s) among a group of scheduled patients who are likely to not show for their scheduled appointment based on past history, weather, traffic, etc.

Machine learning techniques, whether random forests, deep learning networks, and/or other experiential/observational learning system, can be used to locate an object in an image, understand speech and convert speech into text, establish correlations and/or prediction of an event such as a patient no-show, improve the relevance of search engine results, etc., for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Deep learning in a neural network environment includes numerous interconnected nodes referred to as neurons. Input neurons, activated from an outside source, activate other neurons based on connections to those other neurons which are governed by the machine parameters. A neural network behaves in a certain manner based on its own parameters. Learning refines the machine parameters, and, by extension, the connections between neurons in the network, such that the neural network behaves in a desired manner.

Deep learning that utilizes a convolutional neural network segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image, for example, rather than looking for an object, it is more efficient to look for edges which form motifs which form parts, which form the object being sought. These hierarchies of features can be found in many different forms of data such as speech and text, etc.

Learned observable features include objects and quantifiable regularities learned by the machine during supervised learning. A machine provided with a large set of well classified data is better equipped to distinguish and extract the features pertinent to successful classification of new data.

A deep learning machine that utilizes transfer learning may properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given situation.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., a machine has been trained to operate according to a specified threshold, etc.), the machine can be deployed for use (e.g., testing the machine with "real" data, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network can provide direct feedback to another process. In certain examples, the neural network outputs data that is buffered (e.g., via the cloud, etc.) and validated before it is provided to another process.

Figure 4:
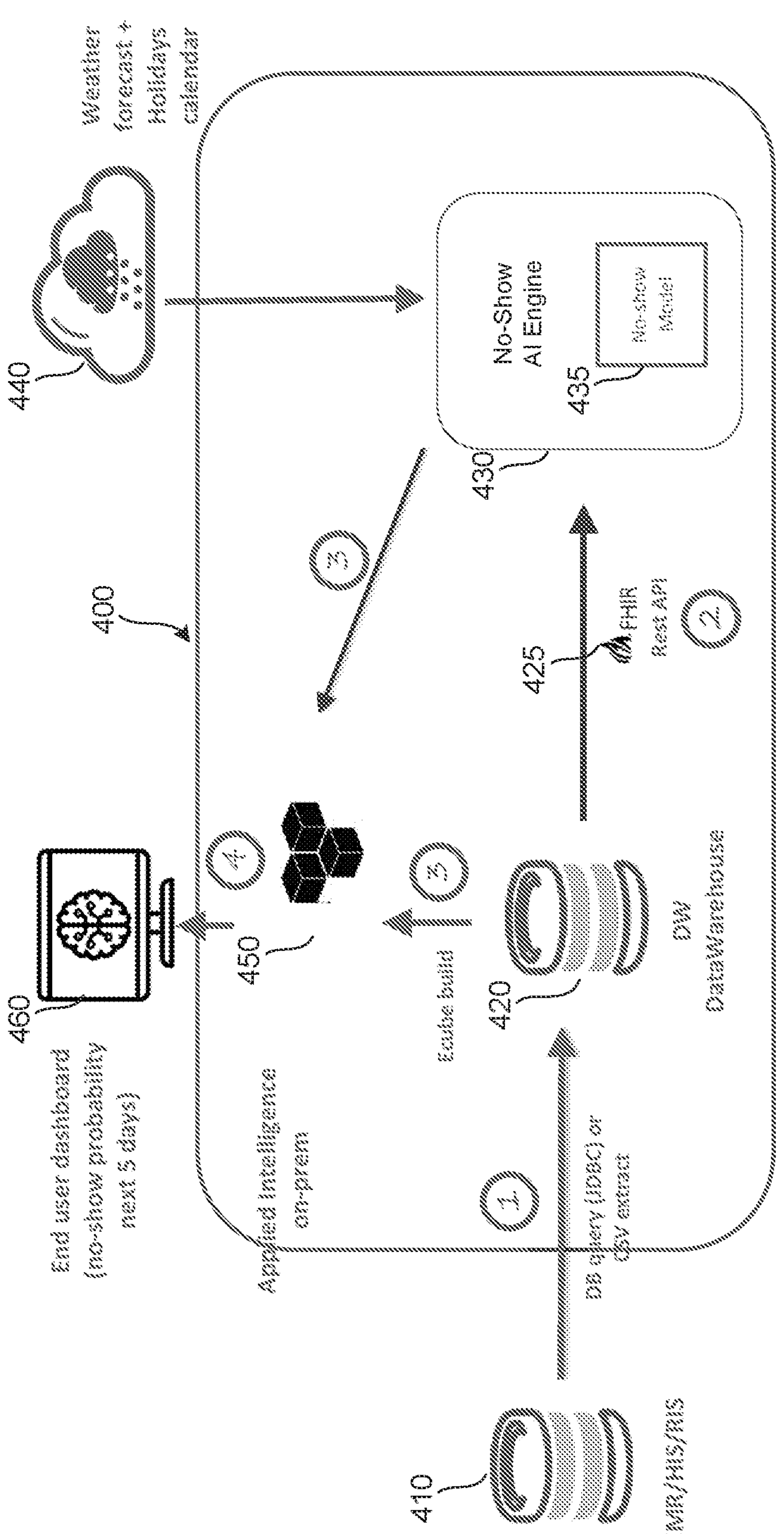
FIG. 4 depicts another example predictive analytics inferencing architecture.

FIG. 4 depicts an alternate example predictive analytics inferencing architecture 400 to identify/predict patient no-shows, similar to but different from the example architecture 100 of FIG. 1. While the example of FIG. 4 is directed to predicting and/or otherwise identifying patient no-shows (e.g., for scheduled exams, procedures, other appointments, etc.), the example architecture 400 can be leveraged for other analytics, modeling, and/or reactive prediction such as patient wait time, diagnosis, imaging insights, predictive reporting, etc. The example architecture 400 includes a query or data extract 1 (e.g., a Java Database Connectivity (JDBC) query, CSV extract, etc.) from a data source 410, such as an EMR, HIS, RIS, etc., to be stored in a data warehouse (DW) 420. An application programming interface (API) 425, such as a REST API, etc., can be used to provide data 2 from the data warehouse 420 to an AI engine 430 (e.g., a no-show AI engine 430), which includes one or more AI model constructs 435 (e.g., a no-show model, etc.). In certain examples, the API 425 can be implemented as a Fast Healthcare Interoperability Resources (FHIR) API 425 defining FHIR resources as a set of operations or interactions with respect to resources in which resources are managed by type. FHIR allows data from the data warehouse 420 to be exposed for training of the model 435, inferencing using the model 435, etc. The data warehouse 420 combines data from a plurality of sources including the information system 410 and other clinical and/or non-clinical data sources such as one or more social, weather, traffic, holiday/calendar, and/or other data stream, dispatch, query, etc. For example, a cloud-based data source 440 can provide weather forecast, holiday calendar, and/or other information to be combined with patient health data, schedule information, capacity, resources, etc., at the AI engine 430. Data is provided to the AI engine 430 and used to generate a predictive output (e.g., a prediction of patient no-show) with the model 435, for example. The FHIR API 425 enables output of the engine 430 to be integrated with other hospital/clinical systems, for example.

Information from the data warehouse 420 and the AI engine 430 can be provided 3 to a data store 450, such as a Sisense ElastiCube analytics database and/or other analytics/relational data store. The data store 450 organizes data for analysis and querying, such as to generate 4 a dashboard 460 for end user interaction. For example, a predictive exam count, no-show probability by time of day, appointment type, patient type, etc., can be displayed for viewing, interaction, etc., via the dashboard 460. The dashboard 460 can also be a retrospective dashboard recapping a number of exams and a corresponding number of patient no-shows, a breakdown of patient no-show by age and/or other demographic, etc. Interaction with the dashboard 460 can drive improvement of the model 435, other adjustment of the engine 430, action at a clinical system 410 (e.g., a change in schedule, duration, resource allocation, etc.), etc.

Figure 5:
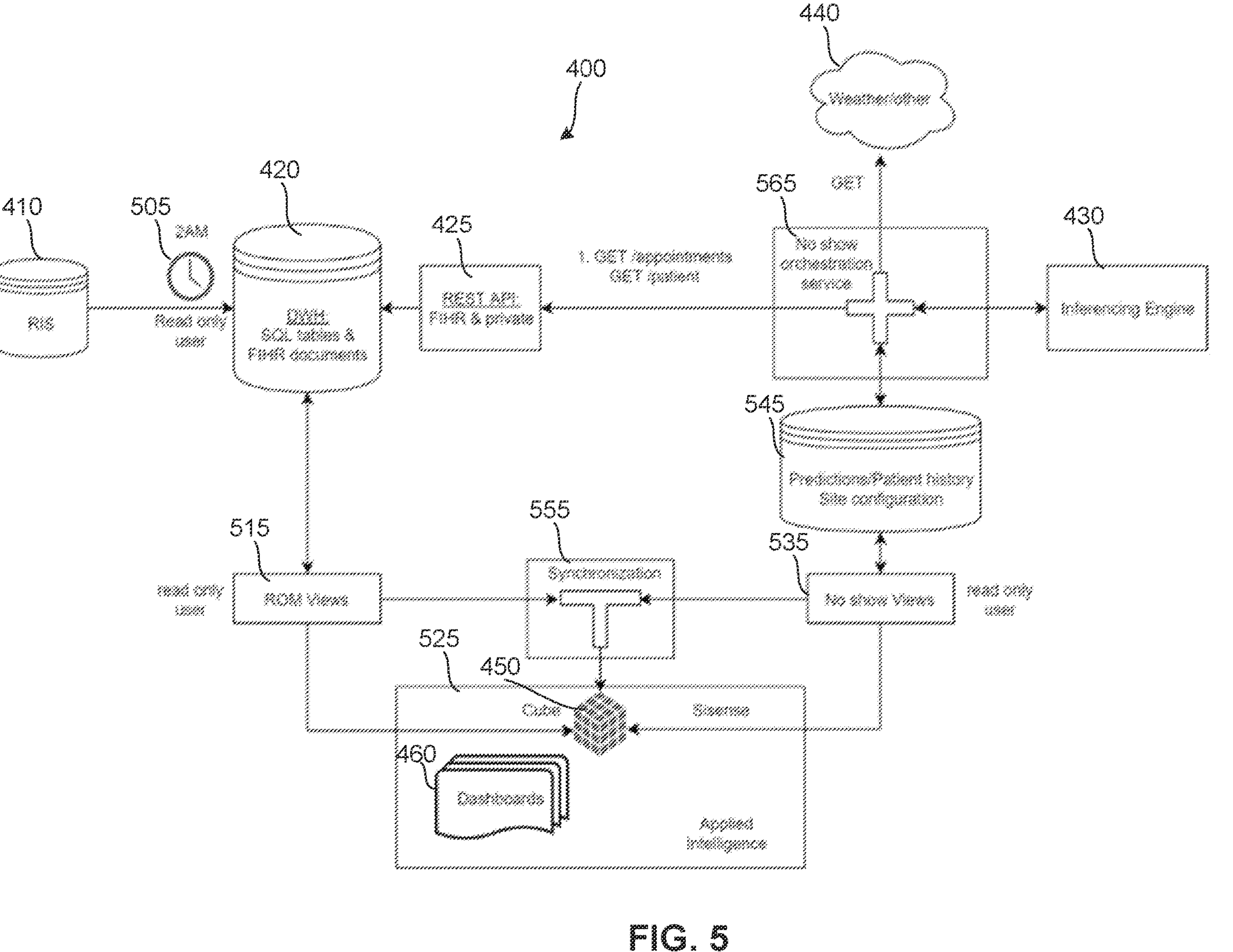
FIG. 5 illustrates a more detailed view of an implementation of the example architecture of FIG. 4.

FIG. 5 depicts the example architecture 400 in operation to predict patient no-shows and generate a dashboard display. As shown in the example of FIG. 5, a query 505 can be scheduled of the data source 410, such as a RIS, etc., to provide an update, download, dispatch, etc., to the data warehouse 420 (e.g., a 2:00 AM read-only data dump from the RSI 410 to the data warehouse 420, etc.). The data warehouse 420 organizes the data according to one or more structured query language (SQL) tables, FHIR documents, etc., for further query, retrieval, analysis, processing, association, etc. Information 515 (e.g., read only memory exchange, etc.) can be exchanged between the data warehouse 420 and an applied intelligence engine 525 including the data cube(s) 450, one or more dashboard 460, etc. The data cube 450 can be used to combine, synchronize, and orchestrate information for predictive output, dashboard 460 generation, dashboard 460 display, etc. Additionally, information 535 regarding no-shows, etc., can provided from a data store 545 of predictions, patient history, site configuration information, etc. Schedule data and no-show data can be synchronized using a synchronizer 555 to provide information to the applied intelligence engine 525 to be organized, correlated, and stored in the data cube 450, used to generate the dashboard(s) 460, etc. The synchronizer 555 combines a retrospective views of data with a prediction to generate content for the dashboard 460, etc.

As shown in the example of FIG. 5, an orchestration service 565 serves as an intermediary between the data store 545, the external weather/holiday/traffic data source 440, and the engine 430 (e.g., in inferencing, rather than training, mode) to correlate weather, holiday, traffic, and/or other information with patient no-show prediction, site information, etc., to drive prediction of patient no-shows, etc. The orchestration service 565 can leverage the FHIR API 425 to get and/or post appointments for a particular location, patients involved in the appointments, etc. Output can be provided via the API 425 in a bi-lateral link with the RIS 410 and/or other scheduling system. As such, when an available appointment slot is retrieved, provided, displayed, suggested, etc., a probability of patient no-show associated with that appointment slot is also determined and provided. A schedule of appointments can be filled and/or otherwise adjusted according to a probability of patient no-show in one or more scheduled appointment slots, for example.

FIGS. 6A-6B show example pipelines 600, 650 for training 600 and inferencing 650 of the AI engine 430 and its model 435. The example training pipeline 600 is used for initial training and re-training after a certain time period has passed, a certain level of feedback has been received, a certain error threshold in predictive no-show percentage/rate/etc. has been exceed, etc. The example training pipeline 600 processes a historical data set from a source system 410 (e.g., RIS, EMR, HIS, PACS, CVIS, etc.). The historical data is loaded into the data warehouse 420 using one or more data ingestion scripts 610 that can extract, transform, format, organize, query, etc., the data from the source system 410 for storage, correlation, other analysis, etc., in the data warehouse 420. The FHIR API 425 can be used to extract historical training data from the data warehouse 420 to be processed by the no-show orchestration service 565 to provide input to the model 435 via a training pipeline 620. Data in the training pipeline 620 is provided as input to train the model 435. One or more model training metrics 630 can be generated analyzed to determine when the model 435 has been trained and is ready for deployment, use, etc., versus adjusting model 435 weights, parameters, etc., to continue the training 600.

Once training is complete, the model 435 can be deployed and/or otherwise activated in an inferencing mode 650. In certain examples, inferencing 650 can be performed daily on a daily update of data from the source system 410. The source system 410 provides a daily refresh to the data ingestion script(s) 610, which store the information in the data warehouse 420. The FHIOR API 425 provides information (e.g., a next five days of appointments, a next day's appointments, a next week's appointments, etc.) to the no-show orchestration service 565 to prepare the information for submission via an inferencing pipeline 660 for input to the AI model 435. The model 435 provides a prediction 670 (e.g., a prediction of patient no-show, etc.), which can be evaluated for accuracy. An accuracy of prediction 670 can be evaluated over time and can trigger retraining 680 if the accuracy of prediction 670 is less than a threshold, outside a range, and/or otherwise fails to satisfy a retraining criterion, for example.

Figure 7:
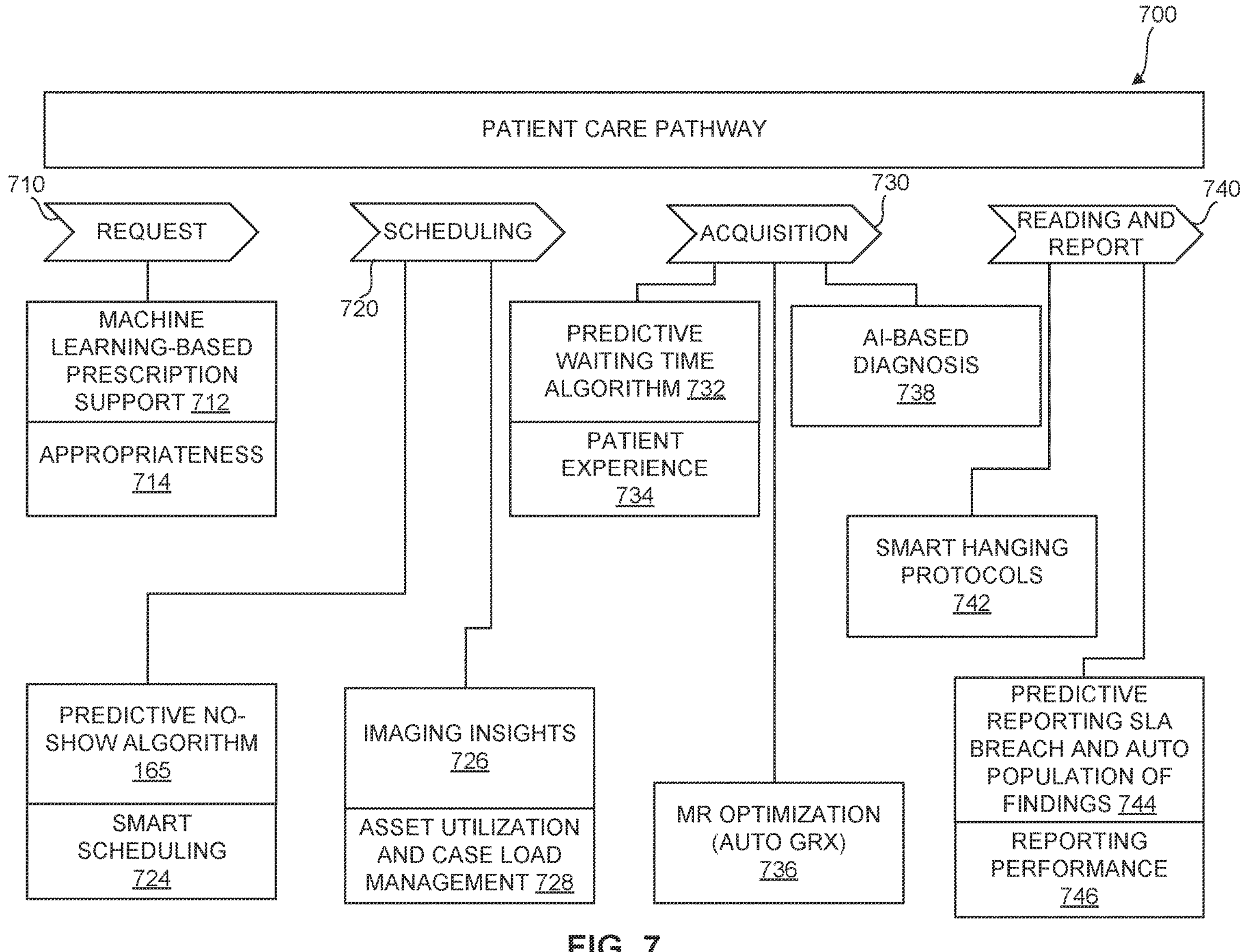
FIGS. 7-8 show example flow charts integrating artificial intelligence-driven prediction and modeling into an example patient care pathway.

FIG. 7 shows an example flow chart integrating AI-driven prediction and modeling into an example patient care pathway 700. At block 710, a request is generated. Machine learning-based prescription support 712 can be provided with an exam request, scheduling request, prescription request, etc., as determined (e.g., using an AI model, etc.) to be appropriate 714 to a given context (e.g., user context, application context, healthcare context, etc.). Appropriateness 714 can be evaluated using an AI model to correlate patient characteristics, symptoms, etc., to prescription information to treat the symptoms for the particular patient composition, for example.

At block 720, scheduling is performed. For example, a predictive no-show algorithm model 165 can be leveraged by a smart scheduler 724 to provide smart scheduling and reduce missed appointments, underutilized resources, delayed patient care, etc. For example, a predicted likelihood of patient no-shows at a location for a time period can be used by the smart scheduler 724 to dynamically adjust or generate a schedule for the time period accounting for likely/unlikely no-shows. Such a schedule can include one or more patients pre-scheduled to fill in for one or more patients missing appointments, one or more patients on standby to fill missing appointment(s) on short notice (e.g., based on likelihood of availability, distance from location, urgency, etc.), etc. At block 720, scheduling can also leverage imaging insights 726 such as a convolutional neural network-based image analysis, etc., to identify one or more objects of interest in an image and/or otherwise perform computer-aided diagnosis of the image data to uncover a likely diagnosis, further aspects to evaluate, etc., which can be automatically scheduled (or suggested to be scheduled) for the patient. Imaging insights 726 can be combined with asset utilization and case load management 728 to schedule patients, staff, and equipment to efficiently accommodate patient, staff, and equipment needs/requirements in an allotted period of time. For example, another AI model can process patients and exams/tests/procedures/etc. to be scheduled with respect to available personnel and equipment resources to provide those exams/tests/procedures/etc., combined with a likelihood of patient no-show and/or other analysis, and provide input to schedule appointments for the time period for the location.

At block 730, data acquisition is conducted. For example, acquisition can leverage a predictive wait time algorithm 732, imaging optimization 736 (e.g., MR optimization, etc.), AI-based computer-aided diagnosis (CAD) 738, etc., to acquire information regarding the patient. For example, the predictive wait time algorithm 732 can provide an indication of how long a patient will wait to be seen, how long an exam/test/procedure will take to be conducted, etc. Such predicted wait time information can be leveraged to provide an improved patient experience 734, for example. Image acquisition settings, etc., can be optimized 736 to improve image acquisition time, image quality, diagnostic analysis, etc., and an AI model can be applied to the resulting image data (e.g., a CNN, other deep learning neural network model, etc.) to predict and/or otherwise provide a diagnosis from the available image and/or other data for the patient, for example.

At block 740, reading and reporting can be provided using a smart hanging protocol 742 to arrange images, test results, exam data, patient history, and/or other information for clinician review. Predictive reporting 744 can provide an indication of a potential SLA breach, auto-populate findings for review and/or further processing, etc., for improved performance 746 in reporting, diagnosis, treatment, propagation of information for further processing, etc.

Figure 8:
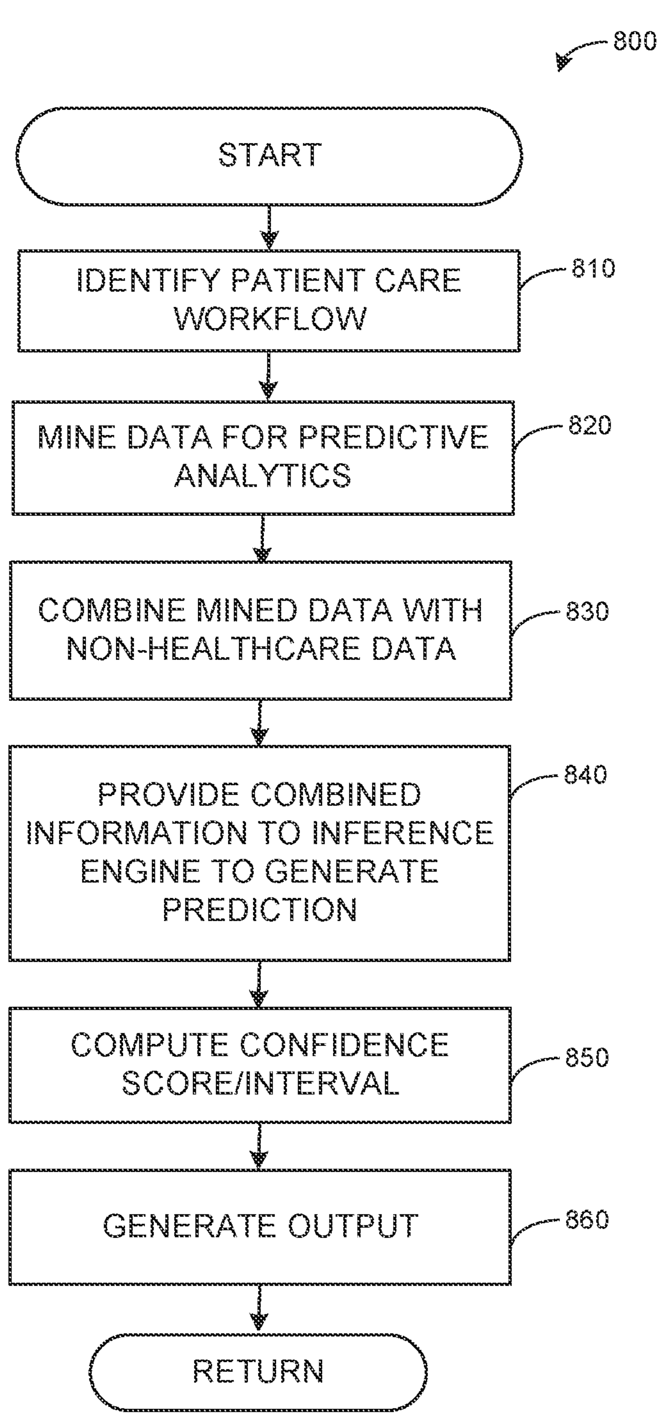

FIG. 8 provides an example illustration of the scheduling (e.g., block 720) of patient care including prediction of and reaction to patient no-shows. At block 810, a patient care workflow is identified (e.g., provided in an exam request/reason for exam, extracted from a patient record, identified in a departmental schedule, etc.). For example, a schedule of one or more patients to be seen by one or more healthcare practitioners at a hospital can be retrieved from a hospital information system 110. At block 820, data related to the identified patient and/or patient care workflow is mined for predictive analytics. For example, data 115 for the patient(s) on the schedule, healthcare practitioner(s) involved in the schedule, resource(s) involved in the schedule, etc., can be extracted from one or more systems 110 such as a HIS, RIS, CIS, CVIS, PACS, LIS, EMR, etc., and mined for predictive analysis. The data cube 120 can format the data 115, combine the data 115, and/or otherwise transform the data 115 to be processed by the inferencing engine 160, for example.

At block 830, mined data is combined with non-healthcare data such as appointment data, weather data, traffic data, resource information, etc. For example, the mined healthcare data 115 is enriched with weather data 150, traffic information relative to patient, provider, and/or other healthcare location, etc. Thus, the healthcare data can be enriched with non-healthcare data providing context, environment, conflicting schedule constraints, etc., that can affect predictive analysis of a future event such as a patient no-show for a scheduled appointment, etc.

At block 840, the combined information is provided to the machine learning inference engine 160 to generate a prediction regarding an outcome associated with the information (e.g., a likelihood or probability of a patient not showing up for an appointment, etc.). For example, a random forest model 165 can be used to represent schedule data, workflow data, patient information, weather and/or traffic projection(s), etc., using a plurality of decision trees. The decision trees can be constructed at training time using known or "ground truth" verified data. Upon deployment in the inference engine 160, the model(s) 165 can output a mode regression and/or mean classification of the decision trees representing a probability of patient no-show, for example.

At block 850, a confidence score and/or interval associated with the prediction is computed. For example, the model 165 may output a yes or no answer and/or a percentage probability that a patient under review will not attend his/her appointment (a no show). The confidence interval associated with the model determination can be formed, for example, by determining a mean probability of patient no show and a standard deviation from the mean over a plurality of determinations (e.g., taking a square root of squared differences in range of available determinations, etc.) and calculating a margin of error using the mean, standard deviation, a desire confidence level (e.g., 90%, 95%, 99%, etc.). The margin of error can be subtracted from the mean and added to the mean to determine your confidence interval around the calculated value from the model 165, for example.

At block 860, an output is generated. For example, a worklist with the prediction, confidence score, and a recommendation/adjustment to the schedule and/or other workflow element are generated and provided based on the combination of prediction and confidence score and/or interval. A result generated by the inference engine 160 and provided to the data access layer 140 via a REST command can be used to drive dashboard 130 output as well as provide output to a scheduler associated with one or more information systems 110 to adjust equipment, personnel, patient, and/or other resource allocation based on integrated workflow prediction(s) 170, for example. Output can be used to help ensure compliance with service level agreement(s)

(SLA), reduce and/or maintain patient wait time, and trigger a reminder and/or other preventative and/or remedial action for one or more patients when the inference engine 160 indicates a high likelihood of patient no-show. Such action, triggered by the engine output 130, 170, etc., can improve resource utilization, patient care, and system responsiveness, for example.

FIGS. 9-14 depict example interfaces generated by the example systems and methods of FIGS. 1-8. For example, FIG. 9 shows an example predictive no-show interface 900. The example interface 900 illustrates predictive patient no-show for radiology examinations based on machine learning from the inference engine 160, for example. For each scheduled patient, a tile 910-912 representing the patient and their appointment is shown in conjunction with weather forecast information 920-922 for their appointment. Alternatively or in addition to weather forecast information, traffic information, etc., can be provided via the example interface 900 in conjunction with the patient 910-912 and prediction 930-932 information. A probability of no-show 930-932 is displayed on the interface 900, and a rescheduling option 940 is presented when the patient has a high probability of missing the scheduled appointment (e.g., >50%, etc.).

Figure 10:
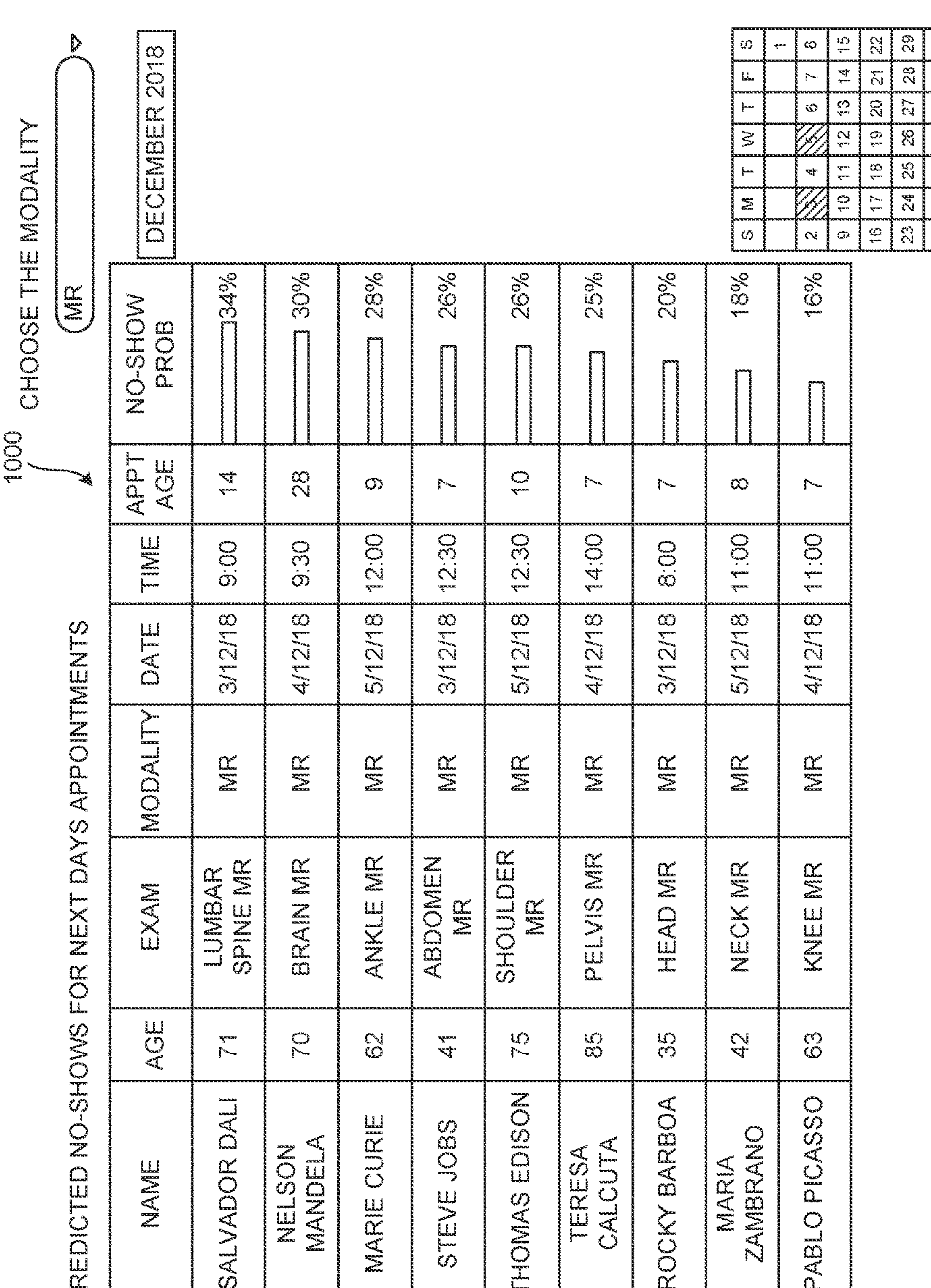

FIG. 10 shows an example dashboard 1000 listing a set of patients and their information, scheduled appointment information, predicted probability of no-show, etc. A user can interact with the example dashboard 1000 to evaluate a schedule or workflow and patients included in that schedule/workflow/worklist. In certain examples, a user can select a patient's no-show probability to view additional information that lead to the generation of the corresponding probability. Selecting a patient and/or other person listed in the dashboard 1000 can retrieve contact information for the person and/or another person to contact them in the event of a no-show, in advance of a probable no-show, etc., to prompt the person to attend, to fill the spot with another person, etc. Via the example interface 1000, a daily schedule, weekly schedule, monthly schedule, etc., can be viewed and modified, for example. In certain examples, a schedule or worklist can be viewed by modality and/or other criterion via the example dashboard interface 1000. The example interface 1000 can provide predicted no-shows for a given modality for a next day's appointments for a user, department, etc., for example.

Figure 11:
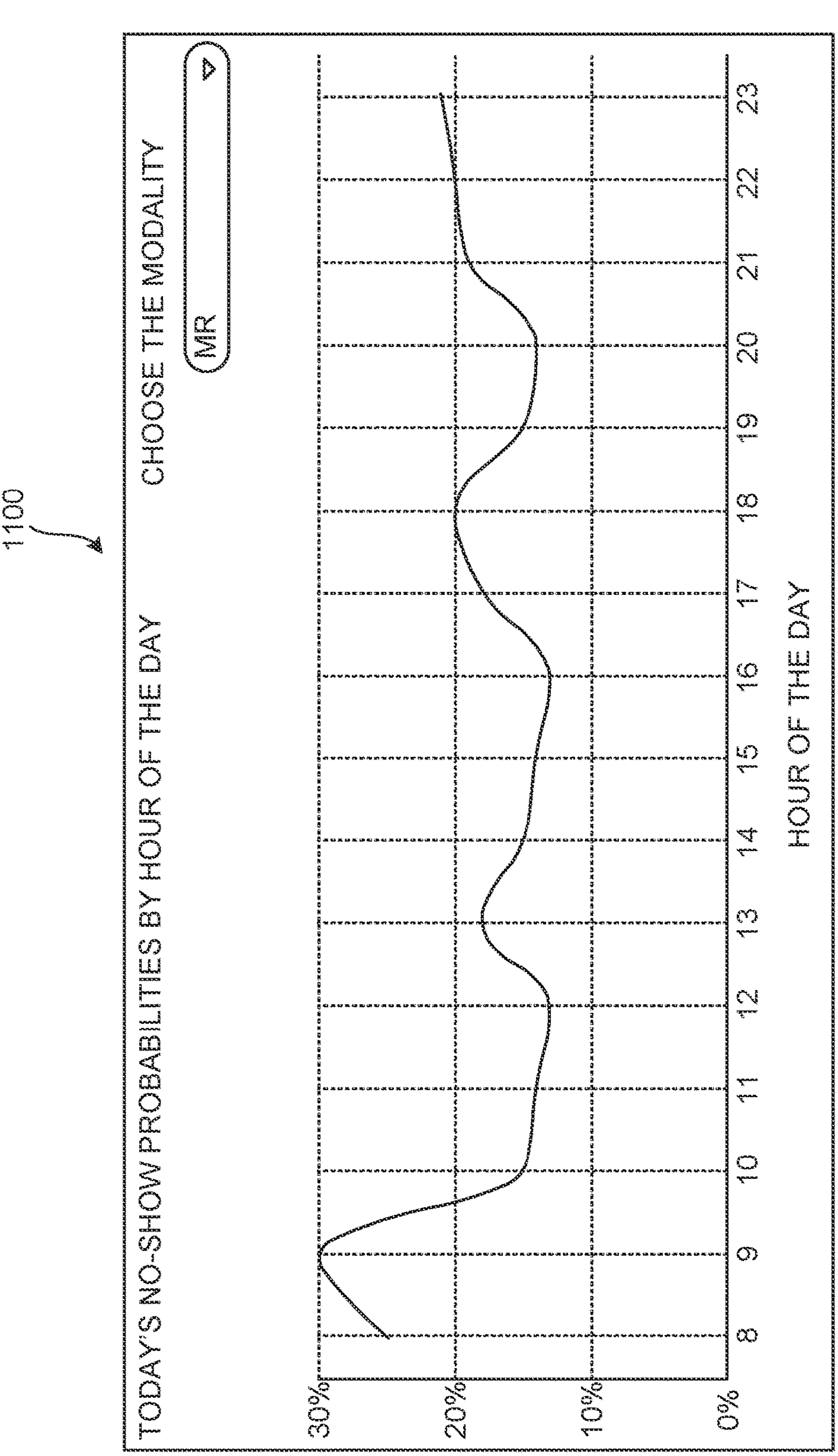

FIG. 11 shows an example graph 1100 of predicted no-show probabilities for each hour of a day. Thus, for a particular modality (e.g., x-ray, ultrasound, MR, etc.), a probability of patient no-show can vary by hour throughout the day. The example graph 1100 conveys the probabilities to a user, for example. Using the example graph 1100, a user can view attendance prediction(s) and plan for demand, strategize to increase demand, etc. In certain examples, the graph 1100 is connected to the dashboard 1000 to allow a user to view a wait list and/or contact information to try and fill empty schedule slots, help ensure a person shows for an appointment, etc.

Figure 12:
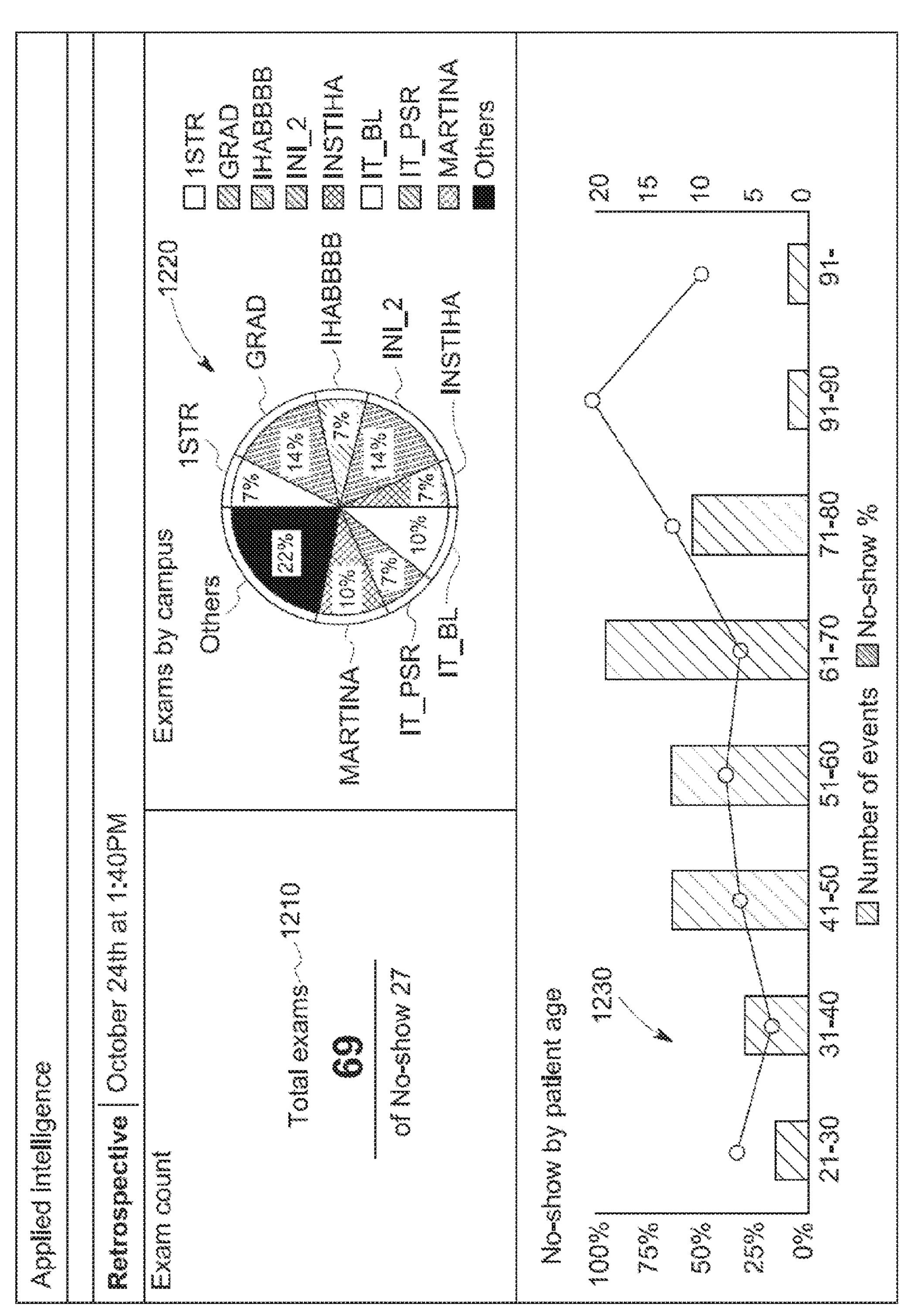
Figure 13:
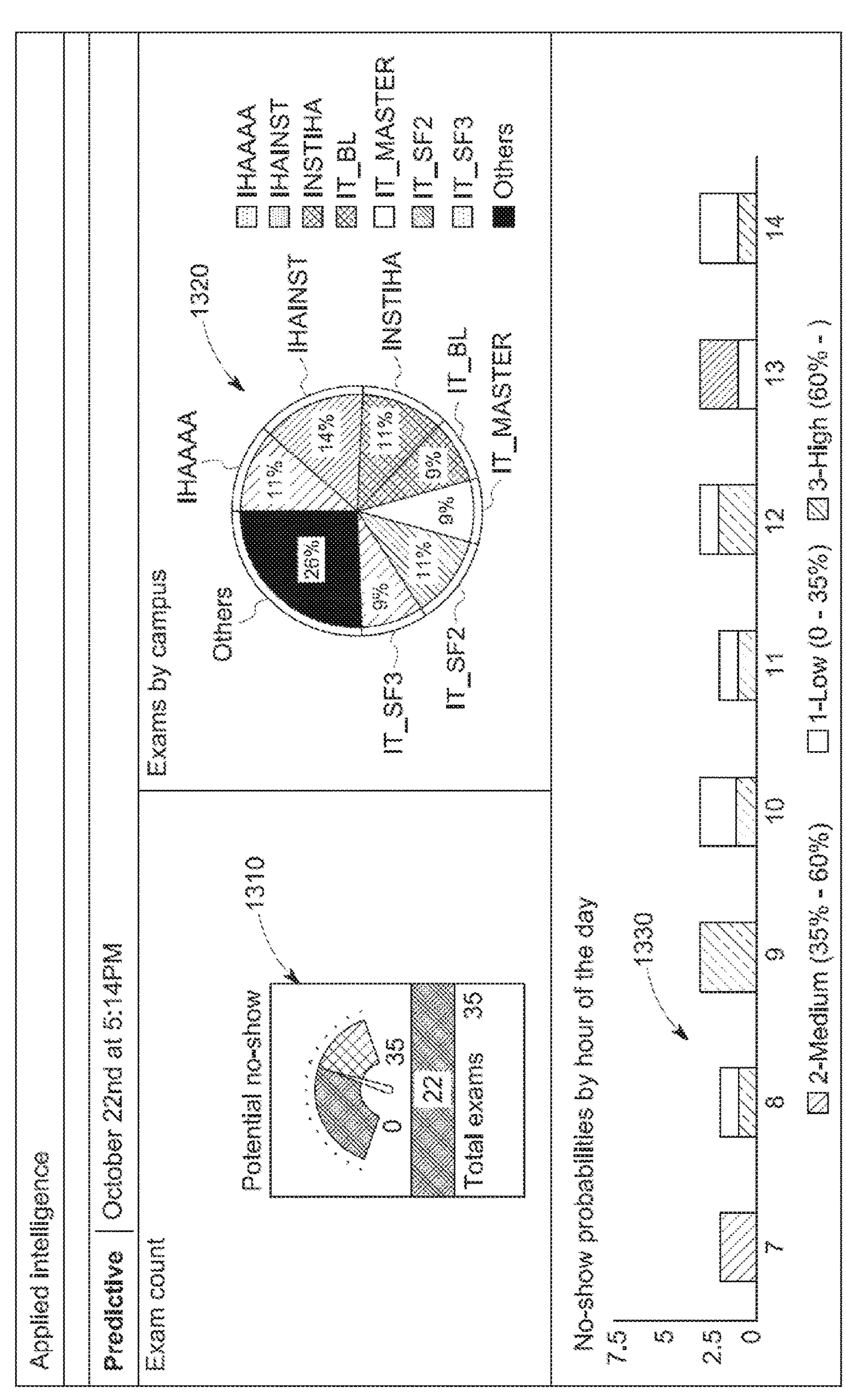

FIG. 12 illustrates an example retrospective dashboard 1200 providing a historical recap or look back at actual no-shows for patient appointments. As shown in the example of FIG. 12, out of a total number of exams for a given day and/or other time period, a number and/or percentage of patient no-shows can be calculated and displayed 1210. Exams and/or other appointments can be broken down by location (e.g., department, facility, etc.), type, and/or other criterion 1220. Additionally, no-shows can be broken down by patient-type, patient age, visit type, etc., to provide a number of events, a no-show percentage, etc. 1230. Elements of the interface 1200 can be selected and/or otherwise interacted with to retrieve patient records, trigger comparative analysis (e.g., between time periods, locations, event types, patients, etc.), FIG. 13 illustrates an example predictive dashboard 1300 providing a prediction of patient no-shows for a particular location, appointment type, etc. For example, the interface 1300 can provide a number and/or percentage of likely no-shows out of a total number of appointments for a location (e.g., facility, department, etc.), a time period, an exam type, etc. 1310. The example dashboard 1300 can break down exams by location (e.g., facility, department, etc.), type, etc. 1320. Additionally, a no-show probability can be calculated and displayed by time, location, etc. 1330. As shown in the example of FIG. 13, the determined patient no-show probability can be categorized into probability levels such as low (e.g., 0-35%), medium (e.g., 35-60%), and high (e.g., 60%+). Probability levels can be used to drive schedule adjustment, notification, etc.

Figure 14:
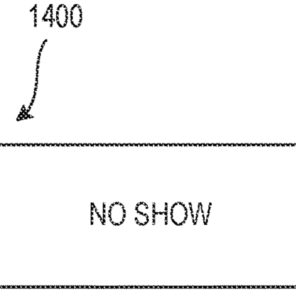

FIG. 14 shows an example random forest output 1400 processing attendance data collected over a period of time (e.g., one year, two years, three years, etc.). In the example of FIG. 14, a confusion matrix can be generated for monitored patient shows and no-shows such as used in training of the machine learning model for no-show prediction. In the example of FIG. 14, a random forest trained and deployed at a healthcare facility is analyzed to identify a number of correctly identified shows, a number of correctly identified no-shows, a number of missed shows, and a number of false positive no-shows to generate predictions at a 90.8% precision with an 82.6% recall from false negatives.

Figure 15:
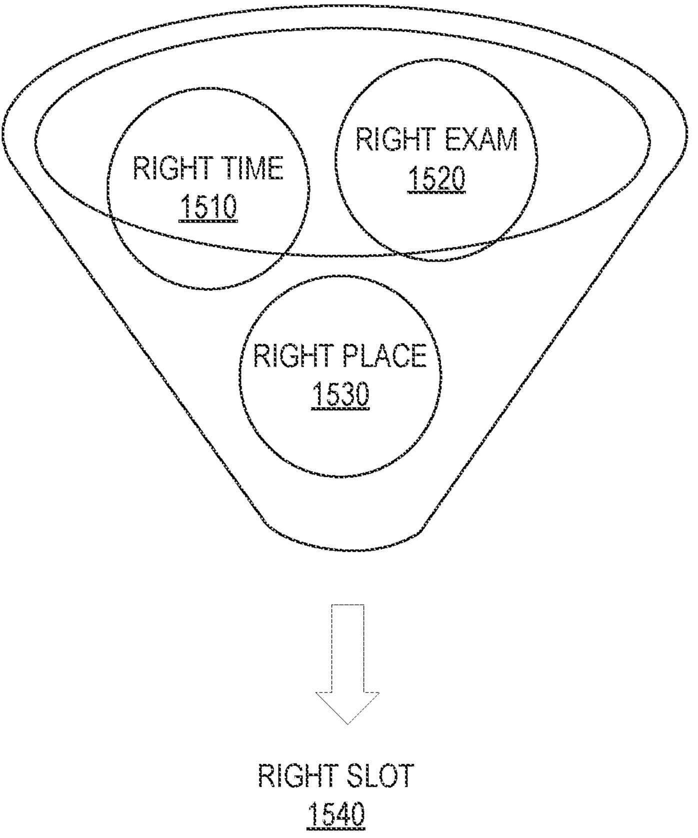
FIGS. 15-16 illustrate example evaluates to determine a slot for an appointment.

Thus, as reflected in FIG. 15, certain examples determine a right time 1510 for a right exam (or operation, etc.) 1520 at a right place 1530 to select an appropriate slot 1540 for a patient. Certain examples configure an appointment and associated resources for the determined time, place, and examination/operation. The functionality of FIG. 15 can be provided via an application programming interface (API), for example. The API can be a vendor-agnostic API provided with a modular scheduling service, for example.

Figure 16:
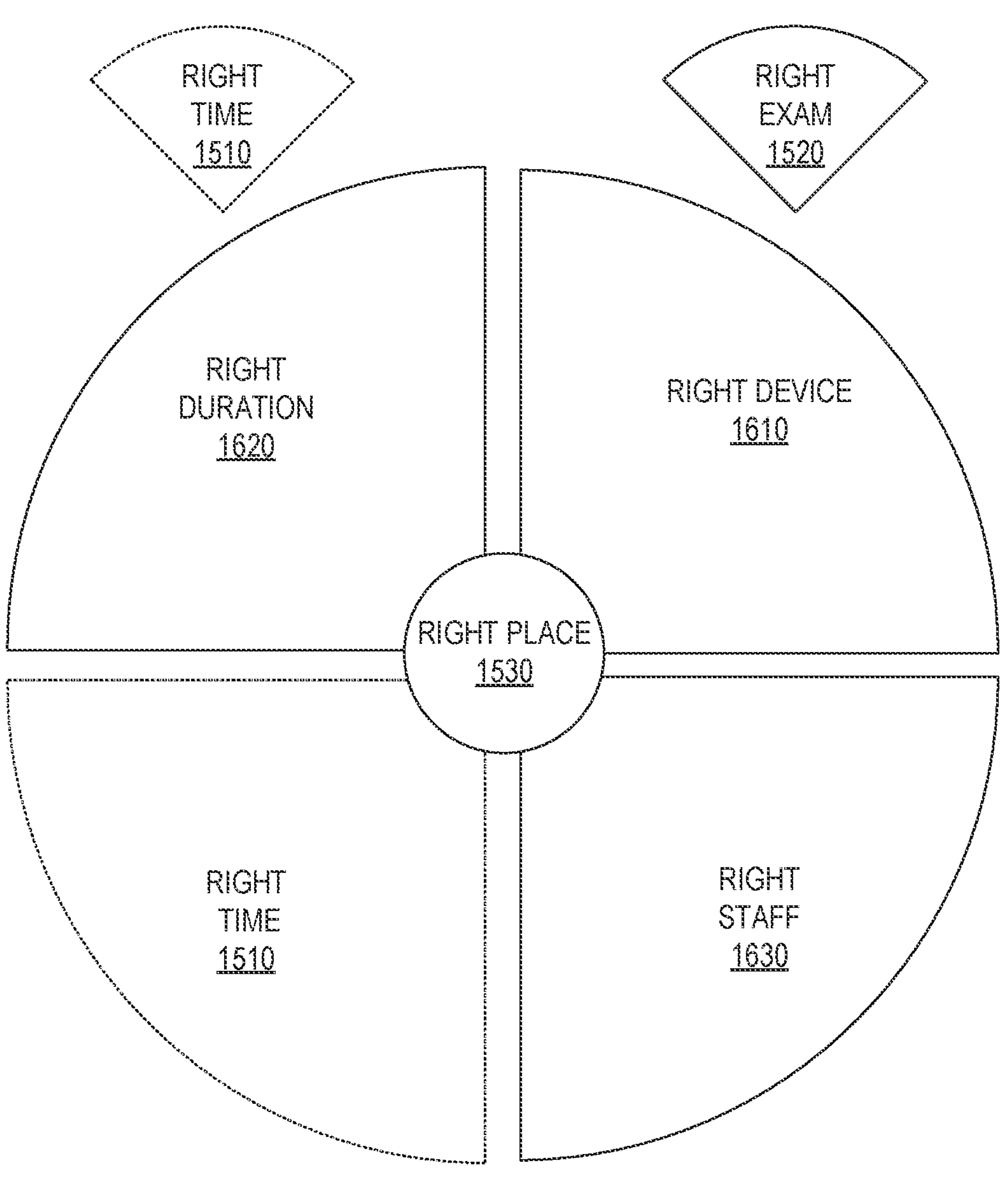

More particularly, as shown in the example of FIG. 16, the right time 1510 and the right exam/operation 1520 can be used to determine an appropriate device 1610, an appropriate duration 1620, and appropriate staff 1630 for the determined examination and/or operation 1520 at an appropriate place 1530. For example, data can be leveraged from historical data analysis to determine the appropriate duration 1620 for the exam 1530 beginning at the determined time 1510. The determined exam 1520 can be used to determine the appropriate device 1610. The time 1510 can be determined based on a no-show probability as well as other features such as patient preference, exam priority, workload prediction, etc. Appropriate staff 1630 for the exam 1520 can be determined based on staff qualification, availability, etc. Such determination and associated processing can be performed for a particular location 1530, for example.

Figure 17:
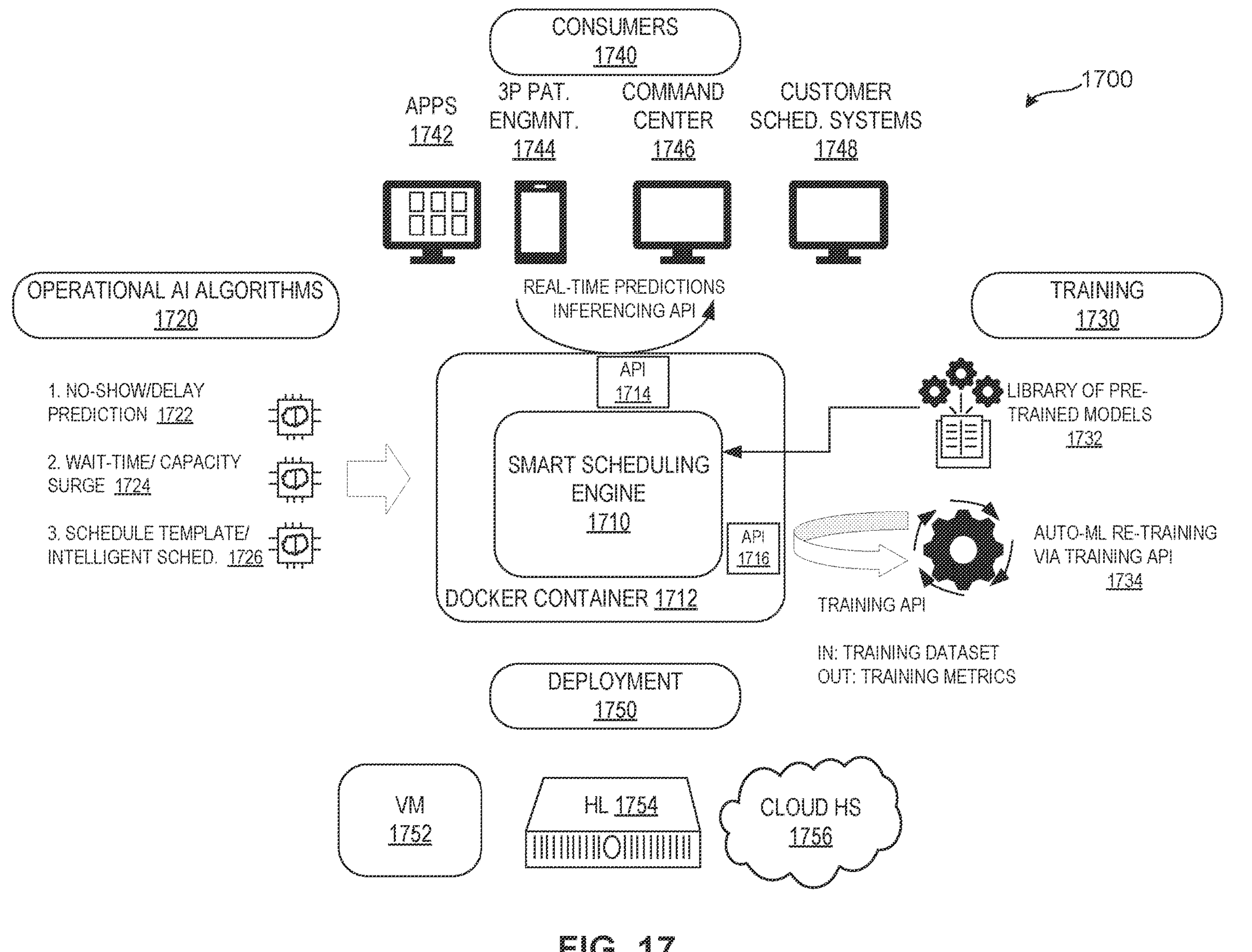
FIGS. 17-18 illustrate a distributed smart scheduling infrastructure, framework, or ecosystem.

FIG. 17 illustrates a distributed smart scheduling infrastructure, framework, or ecosystem 1700. The example distributed smart scheduling infrastructure 1700 provides smart scheduling via an API-as-a-Service, for example. As shown in the example of FIG. 17, a smart scheduling engine 1710 (e.g., the example predictive analytics inferencing architecture 100, 400, etc.) is implemented in a container and/or virtual machine (e.g., a Docker container, etc.) 1712. The scheduling engine 1710 is accessible in the container 1712 via one or more API 1714-1716. The API 1714-1716 define one or more protocols, commands, interface specifications, etc., to enable intake of information into the scheduling engine 1710 and output of prediction(s), scheduling, results, etc., to one or more connected systems/devices, for example.

As shown in the example of FIG. 17, one or more operational AI algorithms 1720 can be input to the scheduling engine 1710. For example, one or more of a patient no-show and/or delay (e.g., late arrival, etc.) prediction algorithm 1722, a wait time/capacity surge algorithm 1724, a scheduling template/intelligent scheduling algorithm 1726, etc., are provided to the scheduling engine 1710 as deployed models, training for scheduling engine 1710 models, etc. The schedule engine 1710 leverages one or more of these algorithms 1722-1726 and/or associated models (e.g., machine learning, deep learning, and/or other AI models, etc.) to generate scheduling and/or other actionable output. The scheduling engine 1710 can also receive one or more training inputs 1730, such as a library 1732 of pre-trained models for each algorithm 1722-1726, region, customer type, consuming application, etc. As shown in the example of FIG. 17, the API 1716 can be a training API to take the input training dataset(s) 1732 and provide an output 1734 of training metrics from the models of the scheduling engine 1710 for model re-training, etc. (e.g., Auto-ML re-training of one or more models based on one or more algorithms 1720 via the training API 1716).

The trained models of the scheduling engine 1710 can be deployed 1750 for use by one or more external devices/systems. For example, deployment 1750 of scheduling engine 1710 functionality and/or access can be via one or more of a virtual machine (VM) 1752, a health link (HL) 1754, a cloud-based health service (HS) 1756, etc. One or more consumers 1740 can also access the scheduling engine 1710 via the API 1714. As shown in the example of FIG. 17, the API 1714 can be an inferencing API which provides real-time prediction information to one or more consumers 1740 such as application(s) 1742, third-party patient engagement system(s) 1744, command center 1746, customer scheduling system(s) 1748, etc.

As such, the scheduling engine 1710 can form a scheduler "bot" as an API-as-a-service to generate a wait-time predictor, a workload predictor, and/or predict a patient's late arrival and/or "no show". The scheduling engine 1710 and its predictors (e.g., predictive AI models and associated pre- and/or post-processing, etc.) can be leveraged to optimize and/or otherwise improve scheduling, staffing, resource allocation, resource configuration, etc. The scheduling engine 1710 and associate API 1714-1716 can be leveraged at time of scheduling as well as at time of appointment, for example. Schedules and associated resource allocation, configuration, etc., can be continuously, periodically, and/or otherwise re-evaluated to re-optimize and/or otherwise improve the schedule and association allocation, configuration, etc., based on changing circumstances, conditions, etc.

Figure 18:
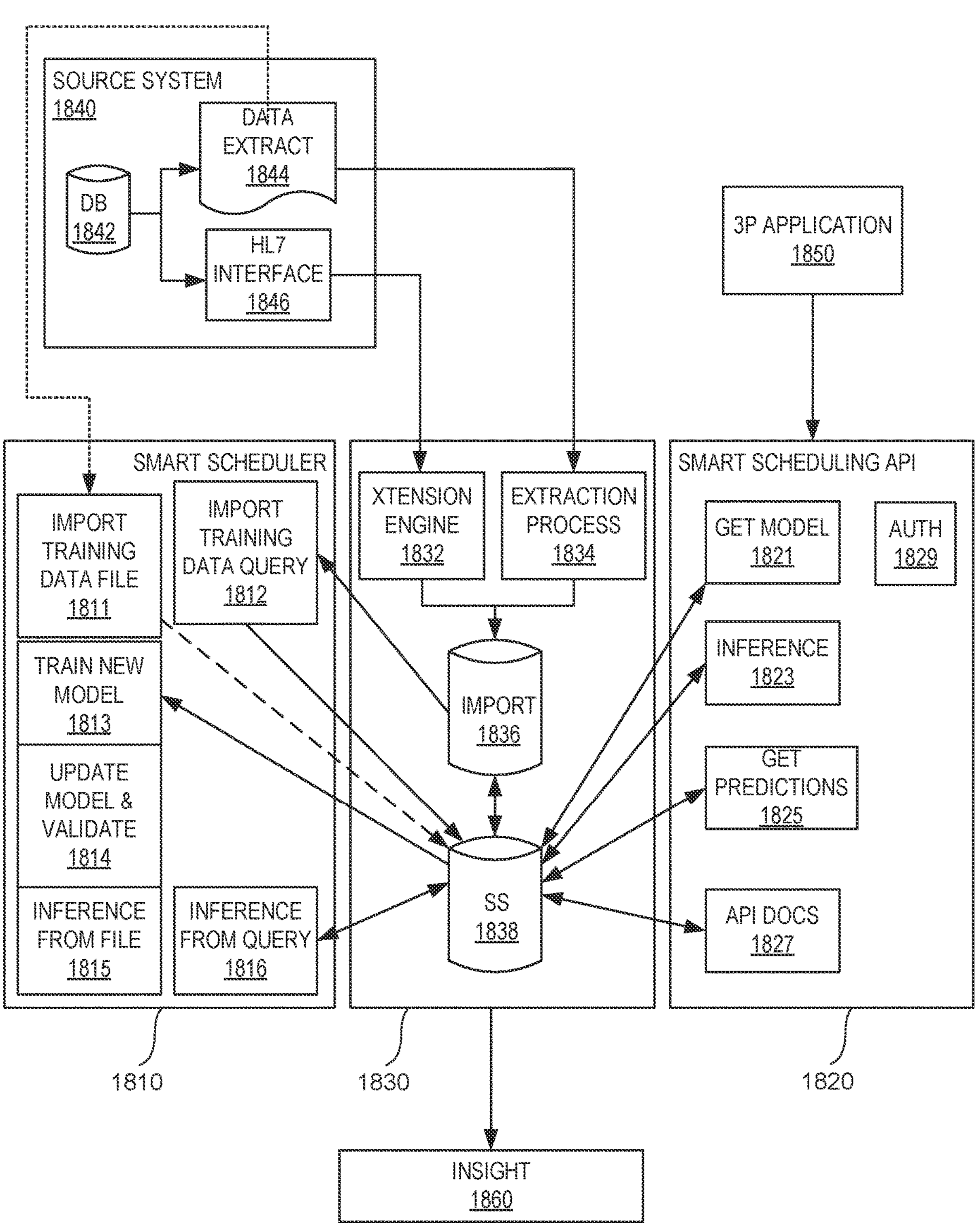

FIG. 18 illustrates an example implementation of the smart scheduling engine 1710 in one or more containers and/or virtual machines. As shown in the example of FIG. 18, the smart scheduling engine 1710 can be implemented as a smart scheduler 1810 and the API 1714 can be implemented as a smart scheduling API 1820 running on one or more virtual machines and/or containers. The smart scheduler 1810 and the smart scheduling API 1820 interact with a data warehouse 1830, which receives/obtains data from a source system 1840.

As shown in the example of FIG. 18, the source system 1840 can include a database 1842 storing data along with data extraction circuitry 1844 and an HL7 interface 1846 to enable retrieval and formatting of data from the database 1842. For example, the HL7 interface 1846 can facilitate exchange of data with an extension engine 1832 of the data warehouse 1830. The data extraction circuitry 1844 can facilitate exchange of data with an extraction processor 1834 of the data warehouse 1830. The extension engine 1832 and the extraction processor 1834 work to gather data for an import set 1836. The import set 1836 can be provided (e.g., pushed and/or pulled) to an import training data query 1812 of the smart scheduler circuitry 1810.

A smart scheduling (SS) data store 1838 can be leveraged to provide insight 1860 as well as information to the smart scheduler circuitry 1810 and/or the smart scheduling API 1820. For example one or more of an import training data file 1811, the import training data query 1812, etc., can leverage information from the smart scheduling data store 1838. The smart scheduler 1810 can use content from the smart scheduling data store 1838 to train a new AI model 1813, for example. The trained model can be updated and validated 1814 by the smart scheduler 1810, for example. An inference (e.g., a prediction, a likelihood, another outcome, etc.) can be generated by the smart scheduler 1810 using the model based on information from one or more input files 1815. Alternatively or additionally, an inference can be generated by the smart scheduler 1810 based on a query 1816 with information from the smart scheduling data store 1838, for example.

The smart scheduling data store 1838 can be leveraged by the smart scheduling API 1820 to get a trained AI model 1821. The API 1820 can also be used to inference 1823 a prediction and/or other outcome using the smart scheduling data store 1838. One or more predictions 1825 can be retrieved from the smart scheduling data store 1838 via the smart scheduling API 1820. Documents 1827 can also be retrieved from the smart scheduling data store 1838 using the example API 1820. In certain examples, the smart scheduling API 1820 can authenticate 1829 users, requests, etc., to access the smart scheduler 1810 and/or the data warehouse 1830 via the smart scheduling API 1820. A third party application 1850 can utilize the API 1820 to inference prediction(s) for scheduling, resource configuration, patient care plan generation, etc.

Figure 19:
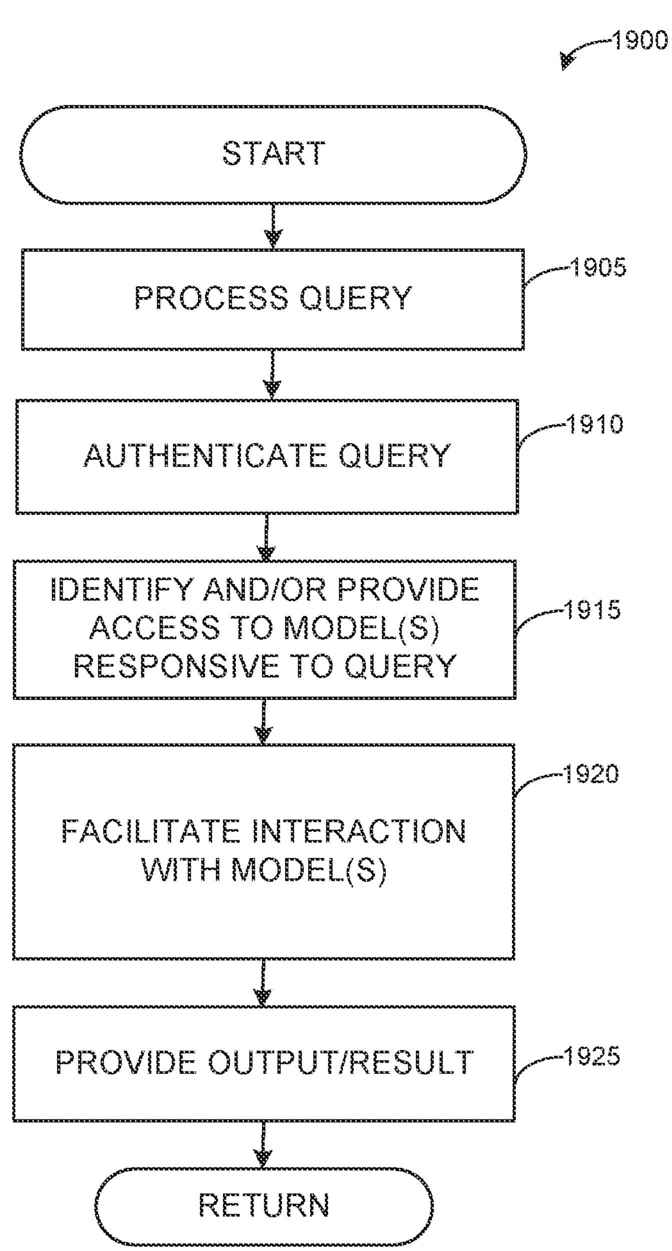
FIG. 19 illustrates a flow diagram of an example method to leverage the smart scheduling framework of FIGS. 17-18.

FIG. 19 illustrates a flow diagram of an example method 1900 to leverage the smart scheduling framework 1700 shown in the examples of FIGS. 17-18. A virtual machine and/or container-based approach, coupled with an accessible API, enables model generation, deployment, storage, and inferencing to be available to a variety of programs, systems, devices, etc., to generate predictions such as patient no show, patient lateness, wait time, etc.

At block 1905, a query is received. For example, a query regarding a patient's likelihood of no show for an appointment is received via the smart scheduling API 1714, 1820. Other queries can include patient lateness, appointment wait time, likelihood of an outcome from the appointment, etc. At block 1910, the query and/or a source of the query can be authenticated 1829 via the API 1714, 1820. For example, a user, a system, a program, and/or the query can be authenticated as identifiable, valid, and authorized to leverage the smart scheduling API 1714, 1820. Authentication can be facilitated based on security certificates (e.g., via HTTPS, etc.), token-based authentication, etc. In some examples, certain user(s), program(s), system(s), etc., are limited in functionality accessible via the API 1714, 1820 (e.g., certain query(-ies), certain model(s), certain output(s), etc.).

At block 1915, identification of and/or access to one or more model(s) corresponding to the query is provided via the API 1714, 1820. For example, the scheduling API 1820 transmits the authenticated query to the smart scheduler 1710, 1810, which identifies and/or surfaces one or more models that can provide an inference and/or other output to address the query. For example, one or more models can be identified based on data associated with the query, API 1820 call parameter(s), a configured workflow of the smart scheduler 1710, 1810, algorithm orchestration, etc. The smart scheduler 1710, 1810 can provide the model identification/access to the API 1714, 1820 and/or to the smart scheduling data store 1838 from which the API 1714, 1820 can retrieve the model identification/access, for example. In certain examples, model(s) are updated by the smart scheduler 1710, 1810, triggered by the query, before being provided in response to the query.

In certain examples, the model information includes information regarding how to interact with the model(s). As such, model(s) responsive to a query can be identified and information provided to enable the requestor to interact with the model(s). In some examples, the information can include an interface enabling interaction with the model(s) through and/or separate from the API 1714, 1820.

At block 1920, interaction with the model(s) is facilitated. For example, the API 1714, 1820 can facilitate execution of the model(s) stored in the data store 1838 and/or hosted by the smart scheduler 1810 directly and/or via an interface provided in response to the query. As such, one or more models can be inferenced to generate a prediction, for example. In some examples, interaction with the model forms a part of the query. In other examples, the query serves to identify the model(s) and interaction with the model(s) follows the query (e.g., via the API 1714, 1820, via a model interface provided in response to the query, etc.).

At block 1925, a result and/or other actionable output is/are provided. In certain examples, information regarding place, time, device, state, duration, etc., is associated with one or more characteristics, which are used together with the model(s) to drive prediction of an outcome (e.g., no show, late, etc.), selection of appointment time/place/type/etc., scheduling, determination of appointment/procedure (e.g., type, time, place, equipment, and/or staff, etc.), etc. In certain examples, the API 1714, 1820 enables an external system such as a scheduling system, laboratory system, clinical system, imaging modality, etc., to leverage a predictive inference output to schedule an exam and/or other appointment, adjust a scheduled exam/appointment, configure the imaging modality and/or other device/system for the appointment, retrieve patient data for the appointment, load a user interface for the appointment, etc. In some examples, the external system provides an API and/or other mechanism to consume the output of the scheduler 1710, 1810.

In some examples, a model functions as a binary classifier to determine, based on available information, a likely outcome (e.g., is the patient likely to show up or not show up, to be on time or late, is the procedure likely to start on time or be delayed, etc.). In certain examples, the predictive/inferencing output of the model can be associated with a confidence level. For example, a no-show can be assigned a value of 1, and a show assigned a value of 0. A threshold value is generated and evaluated from the data being inferenced to determine likelihood of show/no-show. The threshold determines whether the model predicts a patient no show or a patient show. To determine the confidence level, a value between the threshold and 1 is determined (e.g., 0.7). The corresponding range is divided into three confidences: low, medium, and high, for example (e.g., 0.7-0.8 is low, 0.8-0.9 is medium, and 0.9-1.0 is high). The prediction of show/no show generated by the model can then be returned with a confidence level of low, medium, or high depending on the score generated by the model, for example.

As such, according to the example of FIGS. 15-16, one or more models can be accessed via the smart scheduling API 1714, 1820 to identify a right slot for a patient based on a right exam, at a right time, in a right place. Historical data analysis can be used with a model to determine an appropriate (e.g., "right") exam duration. Another model can evaluate availability and/or appropriateness of a device. A model can evaluate availability and appropriate of staff. A model can determine a probability of patient no show and factor in other features such as patient preference, exam priority, workload prediction, etc., to determine a right slot for the procedure at a right place, for example.

As another example, before and/or during a day of an appointment, a model can identify an unexpected load/delay at a location (e.g., for certain resources, staff, etc.). One or more models can be used to identify exams/procedures that can be shifted to a different time, a different place, different equipment/resources, different staff, etc. A patient engagement system (e.g., shown in FIG. 20) can be used to inform patients and allow them to select/confirm a change, for example. As such, a patient care plan can be formed and adjusted by the smart scheduler 1810 leveraging the data warehouse 1830 and accessible to one or more requesting systems, devices, users, programs, etc., via the API 1820, for example.

Figure 20:
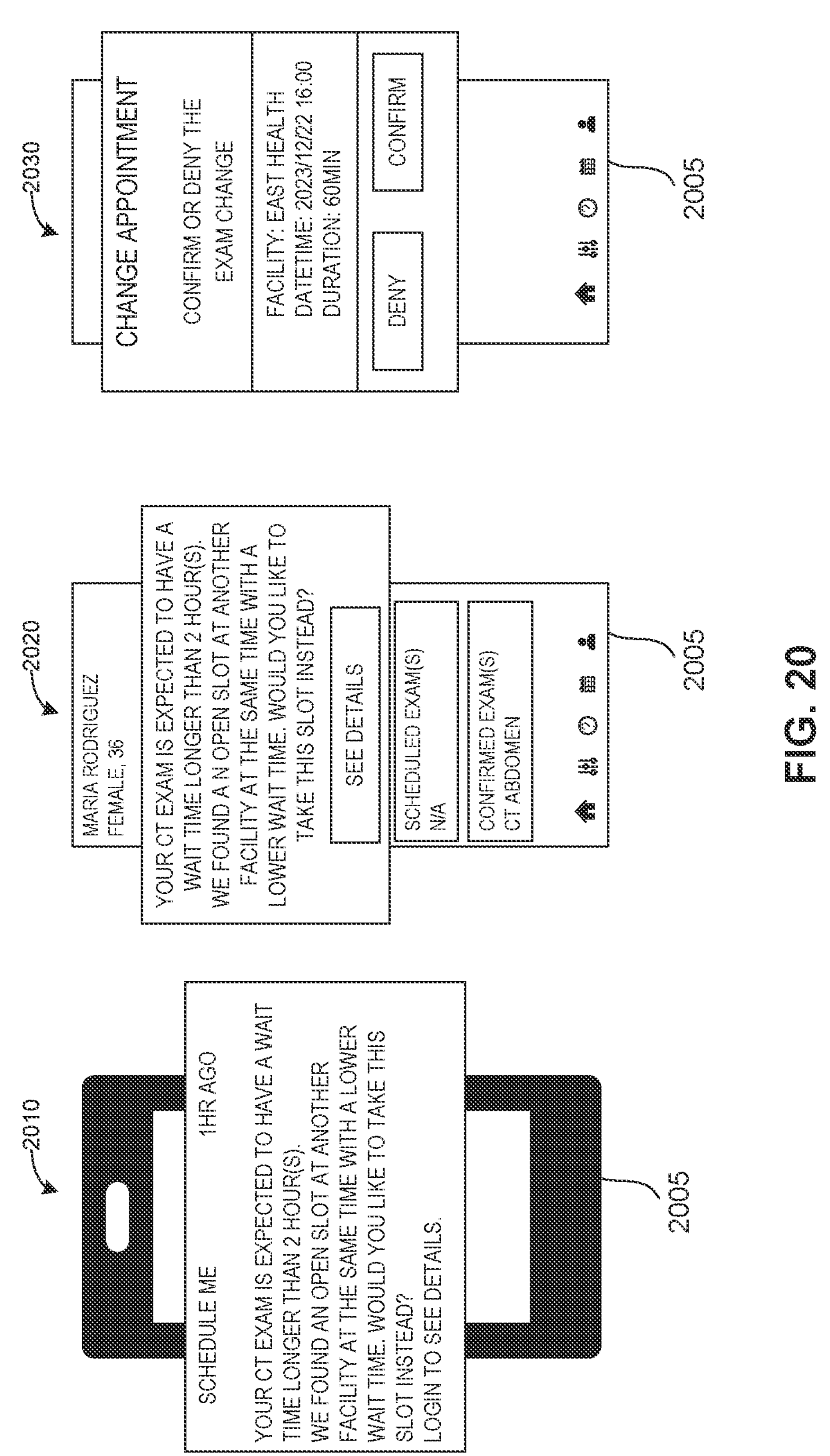
FIG. 20 illustrates an example user interface.

FIG. 20 illustrates an example patient engagement system 2000 with associated user interface 2005. The user interface (e.g., displayed on a display, audible via a speaker, projected, etc.) notifies, at 2010, a user of a wait time for a current appointment and an availability of an alternate slot. At 2020, once logged in/authenticated, the user can view details regarding scheduled exam(s), confirmed exam(s), etc. At 2030, the user can confirm or deny a change in appointment. As such, a schedule for a variety of appointments including lab, imaging, treatment, and/or other item can be scheduled, tracked, and adjusted among multiple facilities for a patient care plan.

Figure 21:
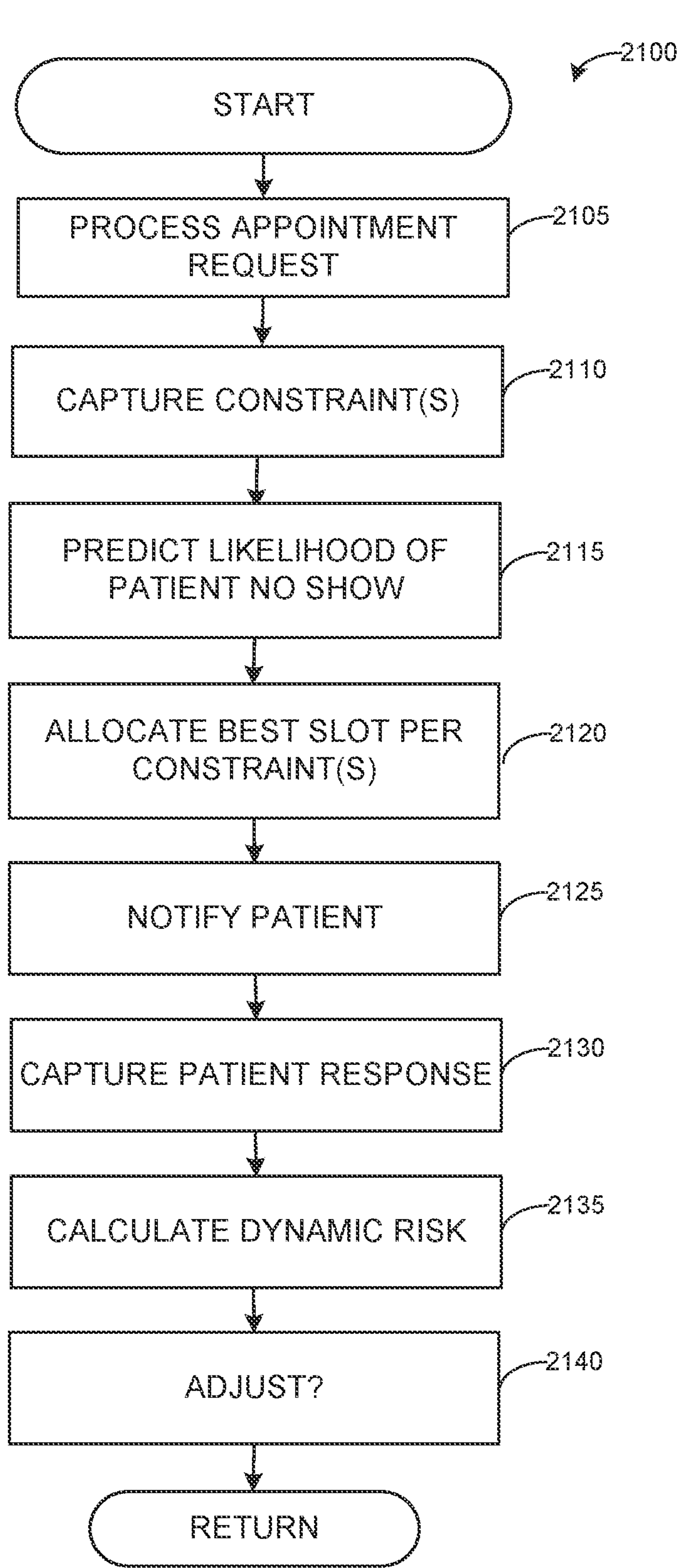
FIGS. 21-23 illustrate flow diagrams of example methods leveraging the smart scheduling framework of FIGS. 17-18.

FIG. 21 illustrates an example scheduling and analysis process 2100 leveraging the smart scheduling 1700, etc. At block 2105, an appointment request is processed. For example, a patient, the patient's physician, another clinician, etc., can request an appointment for an examination, a procedure, etc., via a scheduling system, a scheduling application, a radiology information system, a laboratory system, other clinical system, etc.

At block 2110, constraints are captured. For example, the scheduling system 1700 can capture constraints regarding time, place, appointment type, equipment/resource, personnel, patient condition, etc. Other constraints can include insurance coverage, weather, traffic, wait time, etc. Constraints can be manually entered and/or captured from one or more systems, devices, programs, etc.

At block 2115, the constraints are used by one or more AI models to predict an outcome. For example, the constraints and other input information can be used by one or more models to predict a likelihood of patient no show, lateness, wait time, appointment result, etc. At block 2120, an appointment slot 1540 is allocated based on the constraints and model output. For example, the right slot 1540 is determined based on the right time 1510, right exam 1520, right place 1510, right device 1610, right duration 1620, right staff 1630, and model output (e.g., no show probability, etc.), etc.

At block 2125, a notification of the appointment in the determined slot 1540 is sent. For example, the patient, a scheduling application, a clinical system, etc., receives a notification of the appointment for the patient in the determined slot 1540. At block 2130, a response and/or other acknowledgement is captured.

At block 2135, dynamic schedule risk is calculate using the same and/or different AI model(s) from block 2115. For example, an attendance risk, risk of delay, etc., can be calculated and/or recalculated as the appointment approaches. At block 2140, the appointment can be rescheduled and/or otherwise adjusted, if warranted and/or if approved, based on the model outcome of block 2130.

Figure 22:
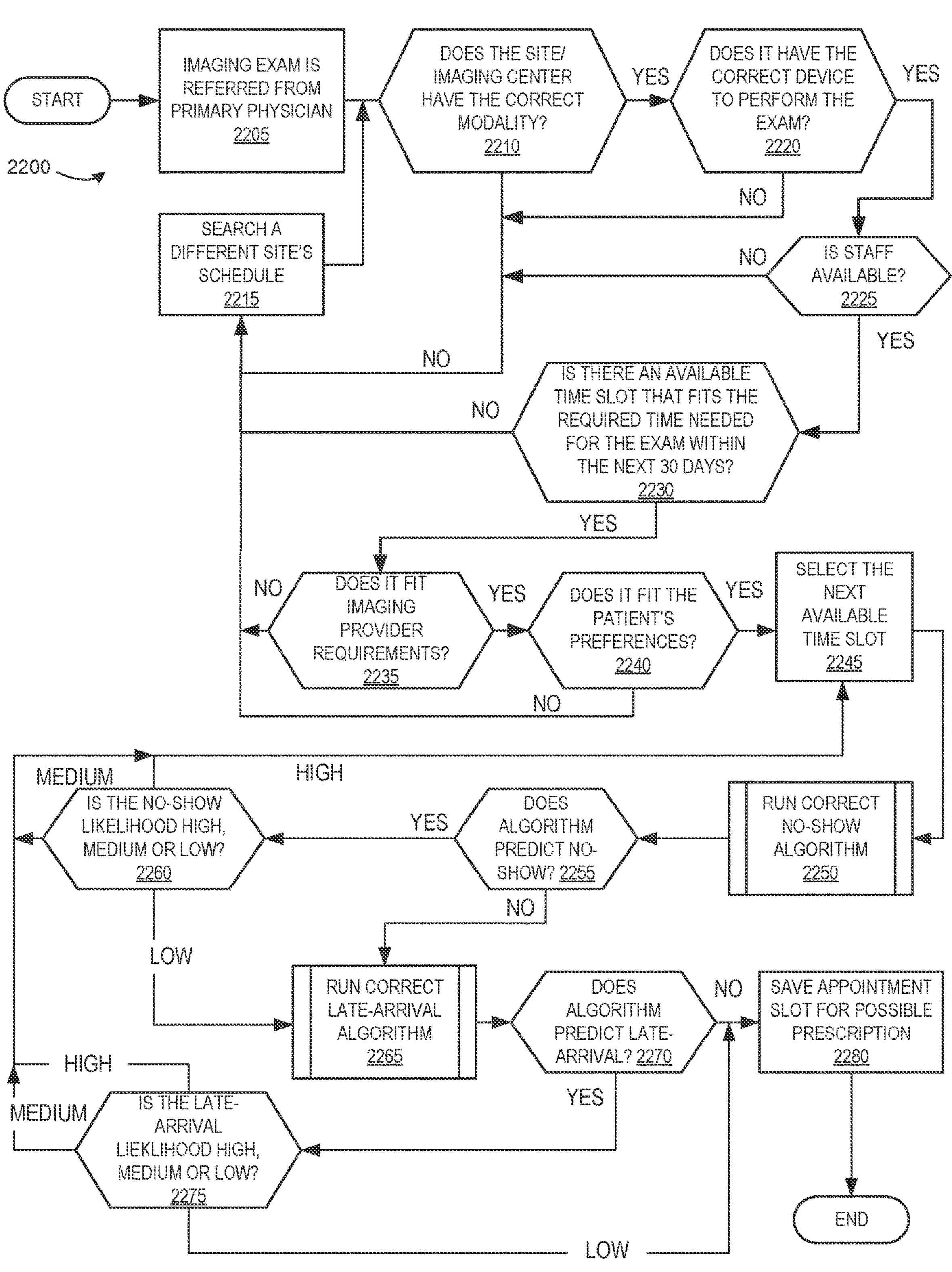

FIG. 22 is a flow diagram of an example process for determining an appointment for an imaging exam. At block 2205, a referral for an imaging exam is received from a physician. For example, a referral for an x-ray, ultrasounds, magnetic imaging exam, etc., is received from a patient's primary physician. At block 2210, an associated location (e.g., an imaging center, hospital, clinic, etc.) is evaluated to determine whether the location has the correct modality. For example, the imaging center is evaluated (e.g., a profile, digital twin, configuration, etc., associated with the location) to determine whether it offers the requested x-ray, ultrasound, Mill, etc. If not, at block 2215, another site is selected for a schedule search.

If the location does have the correct modality, then, at block 2220, the location is evaluated to determine whether the location has the correct device to perform the exam. For example, the location is evaluated to determine whether the imaging center not only offers x-ray imaging (or other requested imaging modality) but has the proper x-ray imaging device to perform the requested exam. If not, then control reverts to block 2215 to search for another location.

If the location has the correct device, then, at block 2225, the location is evaluated to determine whether the right staff is available for the exam. For example, does the location have a technician available to use the device to obtain the exam. If not, then control reverts to block 2215 to search for another site.

If the location has the right staff, then, at block 2230, then the location is evaluated to determine whether there is an available time slot that fits the time frame for the exam. For example, the location schedule is evaluated to determine whether there is an available time slot for the exam within the next thirty days. If not, then control reverts to block 2215 to search for another site.

If the location has an available time slot, then, at block 2235, the location is evaluated to determine whether it fits imaging provider requirements. For example, the location is evaluated to determine whether it satisfies requirements for a provider associated with the x-ray and/or other image exam. If not, then control reverts to block 2215 to search for another site.

If the location satisfies image provider requirements, then, at block 2240, the location is evaluated to determine whether it fits the patient's preferences. For example, the location can be evaluated for proximity to patient home and/or work location, availability, insurance coverage, other preference, etc. If the location does not satisfy the patient's preference, then control reverts to block 2215 to search for another site.

If the location does satisfy the patient's preference, then, at block 2245, an available time slot is selected for the imaging exam. At block 2250, a first model is executed to determine a likelihood of patient no show. For example, the model can be accessed via an interface, executed via an API, provided as a deployed model construct, etc. At block 2255, an output of the model is evaluated to determine whether a no show is predicted. If a no show is predicted, then, at block 2260, the likelihood of no show is evaluated. For example, a confidence level associated with the likelihood of patient no show is evaluated to determine whether the confidence is high, medium, or low. If the confidence level is medium or high, then control reverts to block 2245 to select another time slot.

If the likelihood of patient no show is low or if the model does not predict a no show, then, at block 2265, a second model is executed to determine a likelihood of late arrival. For example, the model can be accessed via an interface, executed via an API, provided as a deployed model construct, etc. At block 2270, an output of the model is evaluated to determine whether a late arrival is predicted. If a late arrival is predicted, then, at block 2275, the likelihood of late arrival is evaluated. For example, a confidence level associated with the likelihood of patient late arrival is evaluated to determine whether the confidence is high, medium, or low. If the confidence level is medium or high, then control reverts to block 2245 to select another time slot.

If the likelihood of late arrival is low or if the model does not predict a late arrival, then, at block 2280, the appointment slot is saved and associated with a prescription for imaging exam for the patient.

Figure 23:
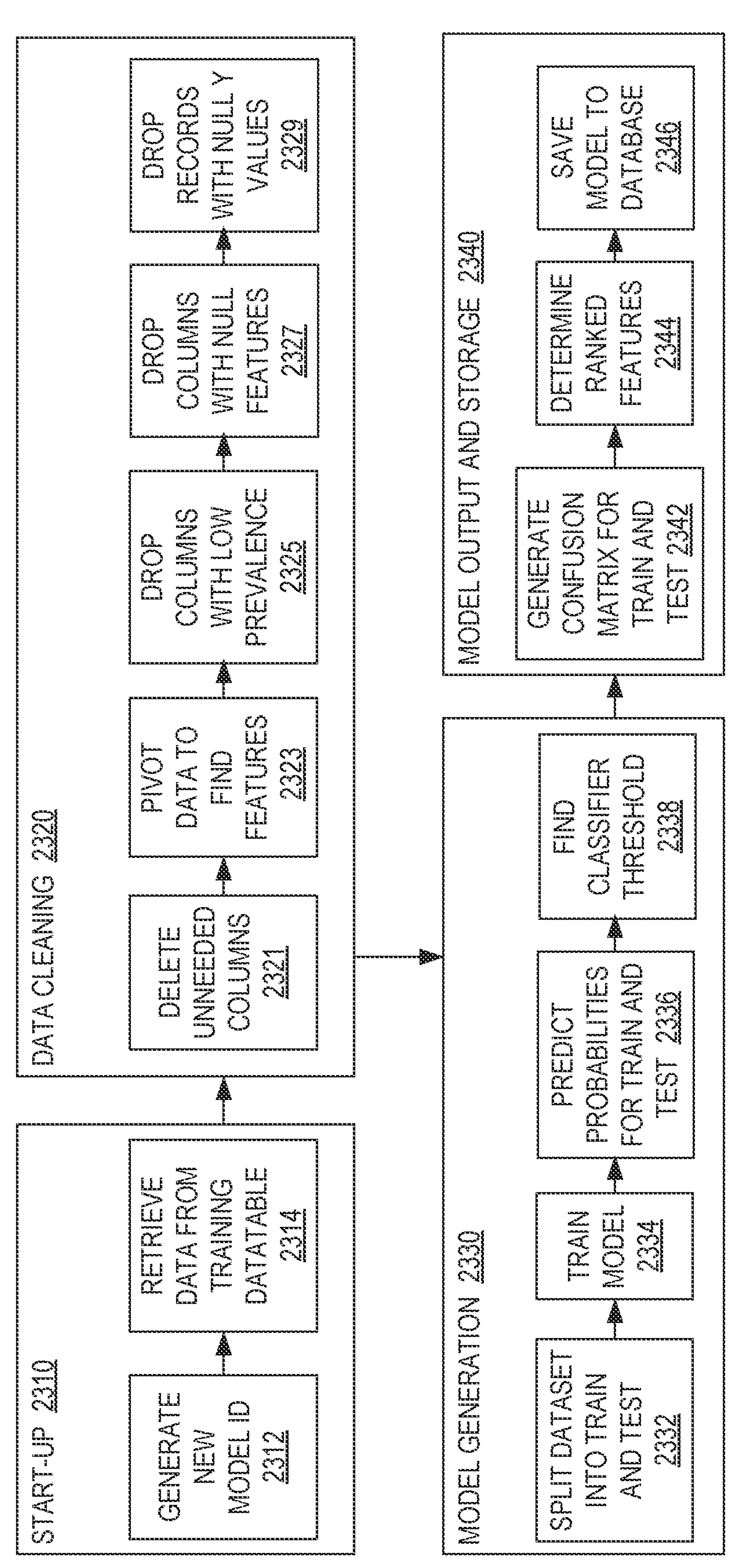

FIG. 23 is a flow diagram of an example process 2300 for training a model, such as a patient no show model, a late arrival model, etc. At block 2310, the model training process begins. For example, at block 2312, an identifier is generated for a new model, and, at block 2314, data is retrieved from a training data table (e.g., imported training data file 1811).

At block 2320, training data is cleaned. For example, at block 2321, unneeded columns are removed from the training data table. At block 2323, data from the training data table is pivoted to identify features in the data. At block 2325, columns with low prevalence are removed from the training data table. At block 2327, columns with null features are removed from the training data table. At block 2329, records with null Y values are removed from the training data table.

At block 2330, the model is generated. For example, at block 2332, the cleaned training data set is split into a training set (e.g., 70% of the data, 80% of the data, 90% of the data, etc.) and a test set (e.g., 30%, 20%, 10%, etc.). At block 2334, the model is trained with the training set. At block 2336, probability for training and testing are predicted. At block 2338, a classifier threshold is identified based on the probabilities.

At block 2340, the trained model is output and stored (e.g., deployed). For example, at block 2342, a confusion matrix is generated for training and test. At block 2344, ranked features are determined. At block 2346, the trained model is saved to a database (e.g., the secure storage data store 1838, etc.).

Figure 24:
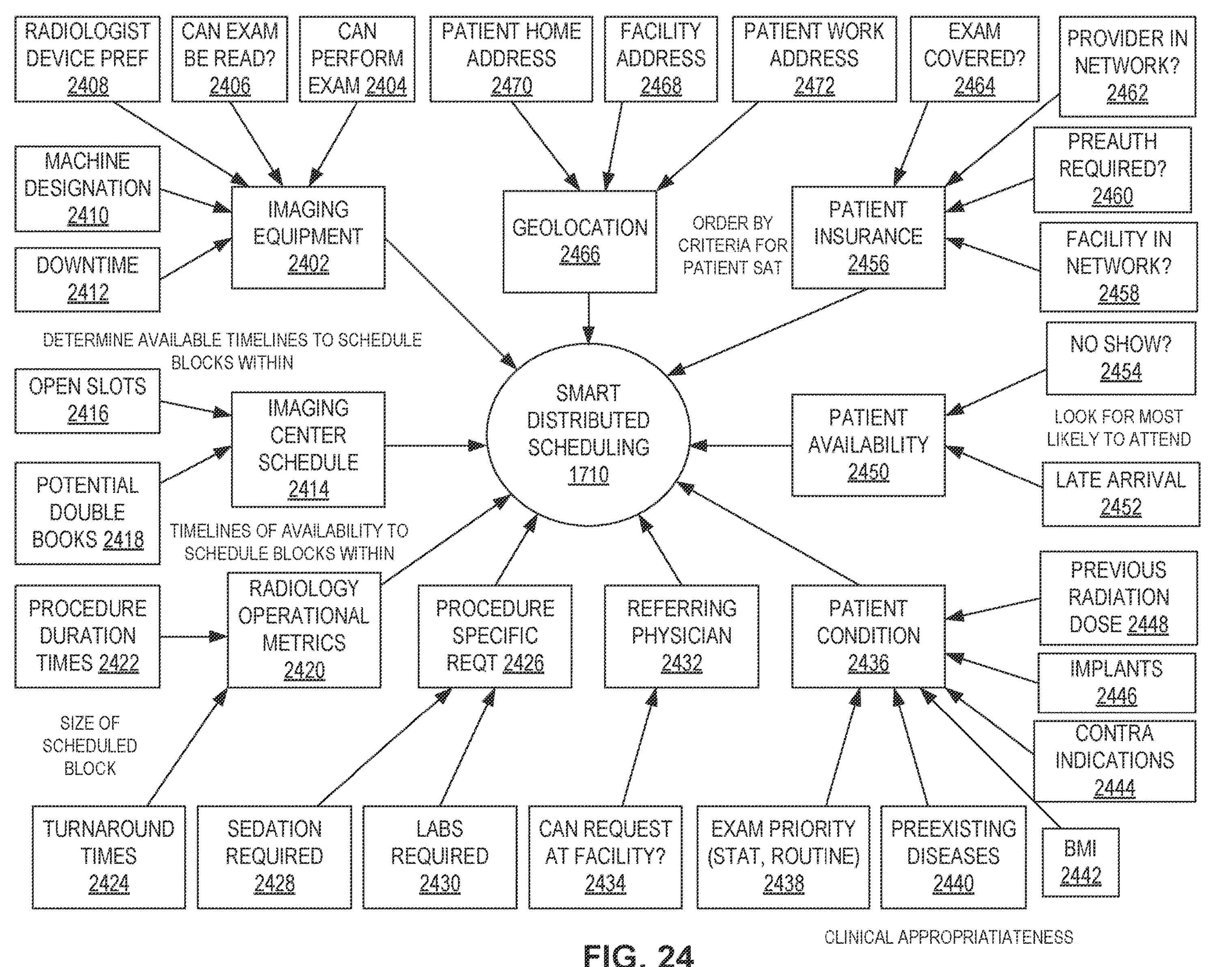
FIG. 24 illustrates an example smart distributed scheduling infrastructure.

As such, the smart scheduling system 1710 can be used to identify and capture appointment schedules for a variety of patients needing a variety of appointments. As shown in the example of FIG. 24, the smart scheduling system 1710 can be implemented for smart distributed scheduling. A plurality of factors, models, requirements, profiles, etc., can be accounted for in determining a scheduling slot for an exam, operation, and/or other appointment.

For example, imaging equipment 2402 can be analyzed to determine available timelines to schedule an exam. For example, the imaging equipment 2402 is evaluated to determine whether the equipment 2402 can be perform a requested exam 2404, as well as whether the obtained exam can then be read 2406. A device preference of a radiologist 2408, a machine designation 2410, and/or machine downtime 2412 can also be evaluated with respect to the imaging equipment 2402.

An imaging center schedule 2414 is analyzed to determine timelines of availability to schedule blocks within. For example, open slots 2416 and potential double-booked slots 2418 are evaluated.

Radiology operational metrics 2420 can also be evaluated to determine a size of the scheduled block. For example, procedure duration time 2422, turnaround time 2424, etc., can be evaluated by the smart scheduler 1710, 1810. One or more procedure-specific requirements 2426 can be evaluated, such as whether sedation is required 2428, whether a lab is required 2430, etc. A referring physician 2432 can be evaluated to determine whether the physician is authorized to request resources at the facility 2434, for example.

Patient condition 2436 can be evaluated. For example, exam priority (e.g., STAT, routine, etc.) 2438 can be used by the smart scheduler 1710. Preexisting condition(s) 2440 of the patient can also be evaluated/used in the evaluation by the smart scheduler 1710, for example. A patient's body mass index (BMI) 2442 can be a factor, as well as contraindications 2444, presence of an implant 2446, previous radiation dosage 2448, etc. Patient availability 2450 is also a factor for the smart scheduler 1710. For example, a determined likelihood of patient late arrival 2452 and/or no show 2454 is factored into the scheduler 1710.

Patient insurance 2456 can also be a scheduling factor. For example, the smart scheduler 1710 can evaluate whether a facility is considered "in network" for patient insurance 2458. Pre-authorization for the exam 2460 may be required. Whether the provider is "in network" 2462 for the patient's insurance can be a factor. Coverage of the exam 2464 by the patient's insurance can also be a factor.

Location (e.g., geolocation or geographic location) 2466 can also be a factor consider by the smart scheduling circuitry 1710. For example, facility address 2468, patient home address 2470, and/or patient work address 2472 can be factors used by the smart scheduler 1710 in scheduling the exam.

As such, the smart scheduling engine 1710, 1810 can leverage a plurality of models and constraints to determine and schedule an appointment (e.g., an exam, a procedure, etc.) with a clinical system.

Flowcharts representative of example machine readable instructions for implementing and/or executing in conjunction with the example systems, algorithms, and interfaces of FIGS. 1-6, 9-18, 20, and 24 are shown in FIGS. 7-8, 19, and 21-23. In these examples, the machine readable instructions comprise a program for execution by a processor such as the processor 2512 shown in the example processor platform 2500 discussed below in connection with FIG. 25. The program can be embodied in software stored on a tangible computer readable storage medium such as a CD-ROM, a floppy disk, a hard drive, a digital versatile disk (DVD), a BLU-RAY™ disk, or a memory associated with the processor 1512, but the entire program and/or parts thereof could alternatively be executed by a device other than the processor 2512 and/or embodied in firmware or dedicated hardware. Further, although the example program is described with reference to the flowchart and/or process(es) illustrated in FIGS. 7-8, 19, and 21-23, many other methods of implementing the examples disclosed and described here can alternatively be used. For example, the order of execution of the blocks can be changed, and/or some of the blocks described can be changed, eliminated, or combined.

As mentioned above, the example process(es) of FIGS. 7-8, 19, and 21-23 can be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process(es) of FIGS. 7-8, 19, and 21-23 can be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The subject matter of this description may be implemented as stand-alone system or for execution as an application capable of execution by one or more computing devices. The application (e.g., webpage, downloadable applet or other mobile executable) can generate the various displays or graphic/visual representations described herein as graphic user interfaces (GUIs) or other visual illustrations, which may be generated as webpages or the like, in a manner to facilitate interfacing (receiving input/instructions, generating graphic illustrations) with users via the computing device(s).

Memory and processor as referred to herein can be stand-alone or integrally constructed as part of various programmable devices, including for example a desktop computer or laptop computer hard-drive, field-programmable gate arrays (FPGAs), application-specific integrated circuits (ASICs), application-specific standard products (ASSPs), system-on-a-chip systems (SOCs), programmable logic devices (PLDs), etc. or the like or as part of a Computing Device, and any combination thereof operable to execute the instructions associated with implementing the method of the subject matter described herein.

Computing device as referenced herein can include: a mobile telephone; a computer such as a desktop or laptop type; a Personal Digital Assistant (PDA) or mobile phone; a notebook, tablet or other mobile computing device; or the like and any combination thereof.

Computer readable storage medium or computer program product as referenced herein is tangible (and alternatively as non-transitory, defined above) and can include volatile and non-volatile, removable and non-removable media for storage of electronic-formatted information such as computer readable program instructions or modules of instructions, data, etc. that may be stand-alone or as part of a computing device. Examples of computer readable storage medium or computer program products can include, but are not limited to, RAM, ROM, EEPROM, Flash memory, CD-ROM, DVD-ROM or other optical storage, magnetic cassettes, magnetic tape, magnetic disk storage or other magnetic storage devices, or any other medium which can be used to store the desired electronic format of information and which can be accessed by the processor or at least a portion of the computing device.

The terms module and component as referenced herein generally represent program code or instructions that causes specified tasks when executed on a processor. The program code can be stored in one or more computer readable mediums.

Network as referenced herein can include, but is not limited to, a wide area network (WAN); a local area network (LAN); the Internet; wired or wireless (e.g., optical, Bluetooth, radio frequency (RF)) network; a cloud-based computing infrastructure of computers, routers, servers, gateways, etc.; or any combination thereof associated therewith that allows the system or portion thereof to communicate with one or more computing devices.

The term user and/or the plural form of this term is used to generally refer to those persons capable of accessing, using, or benefiting from the present disclosure.

Figure 25:
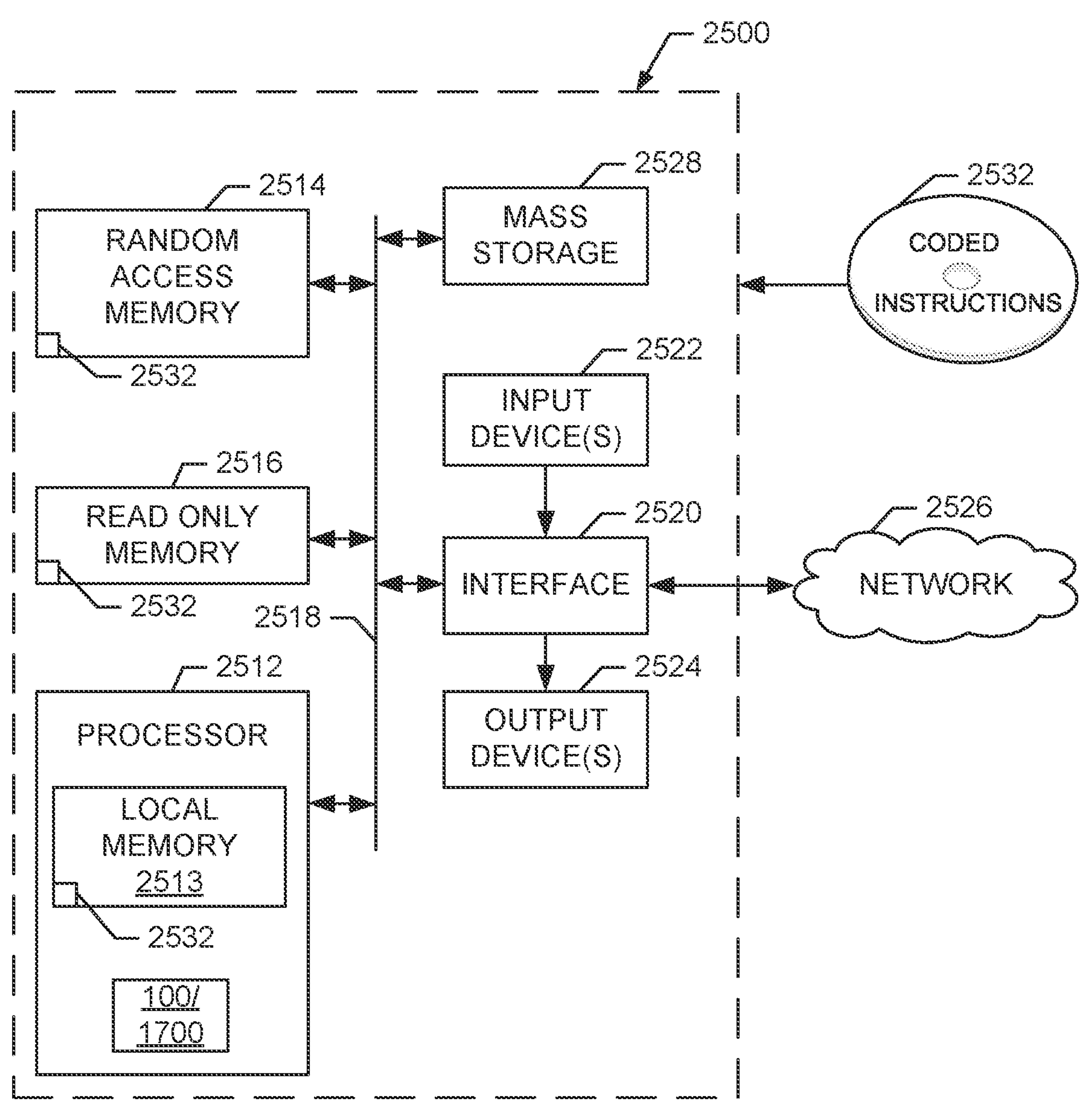
FIG. 25 is a block diagram of an example processor platform capable of executing instructions to implement the example systems and methods disclosed and described herein.

FIG. 25 is a block diagram of an example processor platform 2500 capable of executing instructions to implement the example systems and methods disclosed and described herein. The processor platform 2500 can be, for example, a server, a personal computer, a mobile device (e.g., a cell phone, a smart phone, a tablet such as an IPAD™), a personal digital assistant (PDA), an Internet appliance, or any other type of computing device.

The processor platform 2500 of the illustrated example includes a processor 2512. The processor 2512 of the illustrated example is hardware. For example, the processor 2512 can be implemented by one or more integrated circuits, logic circuits, microprocessors or controllers from any desired family or manufacturer.

The processor 2512 of the illustrated example includes a local memory 2513 (e.g., a cache). The processor 2512 of the illustrated example is in communication with a main memory including a volatile memory 2514 and a non-volatile memory 2516 via a bus 2518. The volatile memory 2514 can be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2516 can be implemented by flash memory and/or any other desired type of memory device. Access to the main memory 2514, 2516 is controlled by a memory controller.

The processor platform 2500 of the illustrated example also includes an interface circuit 2520. The interface circuit 2520 can be implemented by any type of interface standard, such as an Ethernet interface, a universal serial bus (USB), and/or a PCI express interface.

In the illustrated example, one or more input devices 2522 are connected to the interface circuit 2520. The input device(s) 2522 permit(s) a user to enter data and commands into the processor 2512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2524 are also connected to the interface circuit 2520 of the illustrated example. The output devices 2524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2520 of the illustrated example, thus, typically includes a graphics driver card, a graphics driver chip or a graphics driver processor.

The interface circuit 2520 of the illustrated example also includes a communication device such as a transmitter, a receiver, a transceiver, a modem and/or network interface card to facilitate exchange of data with external machines (e.g., computing devices of any kind) via a network 2526 (e.g., an Ethernet connection, a digital subscriber line (DSL), a telephone line, coaxial cable, a cellular telephone system, etc.).

The processor platform 2500 of the illustrated example also includes one or more mass storage devices 2528 for storing software and/or data. Examples of such mass storage devices 2528 include floppy disk drives, hard drive disks, compact disk drives, Blu-ray disk drives, RAID systems, and digital versatile disk (DVD) drives.

The coded instructions 2532 can be stored in the mass storage device 2528, in the volatile memory 2514, in the non-volatile memory 2516, and/or on a removable tangible computer readable storage medium such as a CD or DVD. The instructions 2532 can be executed by the processor 2512 to implement the example system 100, 400, etc., as disclosed and described above.

FIG. 25 is a block diagram of an example implementation of the processor circuitry 2512 of FIG. 25. In this example, the processor circuitry 2512 of FIG. 25 is implemented by a microprocessor 2600. For example, the microprocessor 2600 may be a general purpose microprocessor (e.g., general purpose microprocessor circuitry). The microprocessor 500 executes some or all of the machine readable instructions to effectively instantiate the circuitry described herein as logic circuits to perform the operations corresponding to those machine readable instructions. In some such examples, the circuitry is instantiated by the hardware circuits of the microprocessor 2600 in combination with the instructions. For example, the microprocessor 2600 may be implemented by multi-core hardware circuitry such as a CPU, a DSP, a GPU, an XPU, etc. Although it may include any number of example cores 2602 (e.g., 1 core), the microprocessor 2600 of this example is a multi-core semiconductor device including N cores. The cores 2602 of the microprocessor 2600 may operate independently or may cooperate to execute machine readable instructions. For example, machine code corresponding to a firmware program, an embedded software program, or a software program may be executed by one of the cores 2602 or may be executed by multiple ones of the cores 2602 at the same or different times. In some examples, the machine code corresponding to the firmware program, the embedded software program, or the software program is split into threads and executed in parallel by two or more of the cores 2602. The software program may correspond to a portion or all of the machine readable instructions and/or operations disclosed herein.

The cores 2602 may communicate by a first example bus 2604. In some examples, the first bus 2604 may be implemented by a communication bus to effectuate communication associated with one(s) of the cores 2602. For example, the first bus 2604 may be implemented by at least one of an Inter-Integrated Circuit (I2C) bus, a Serial Peripheral Interface (SPI) bus, a PCI bus, or a PCIe bus. Additionally or alternatively, the first bus 2604 may be implemented by any other type of computing or electrical bus. The cores 2602 may obtain data, instructions, and/or signals from one or more external devices by example interface circuitry 2606. The cores 2602 may output data, instructions, and/or signals to the one or more external devices by the interface circuitry 2606. Although the cores 2602 of this example include example local memory 2620 (e.g., Level 1 (L1) cache that may be split into an L1 data cache and an L1 instruction cache), the microprocessor 2600 also includes example shared memory 2610 that may be shared by the cores (e.g., Level 2 (L2 cache)) for high-speed access to data and/or instructions. Data and/or instructions may be transferred (e.g., shared) by writing to and/or reading from the shared memory 2610. The local memory 2620 of each of the cores 2602 and the shared memory 2610 may be part of a hierarchy of storage devices including multiple levels of cache memory and the main memory (e.g., the main memory 2514, 2516 of FIG. 25). Typically, higher levels of memory in the hierarchy exhibit lower access time and have smaller storage capacity than lower levels of memory. Changes in the various levels of the cache hierarchy are managed (e.g., coordinated) by a cache coherency policy.

Figure 26:
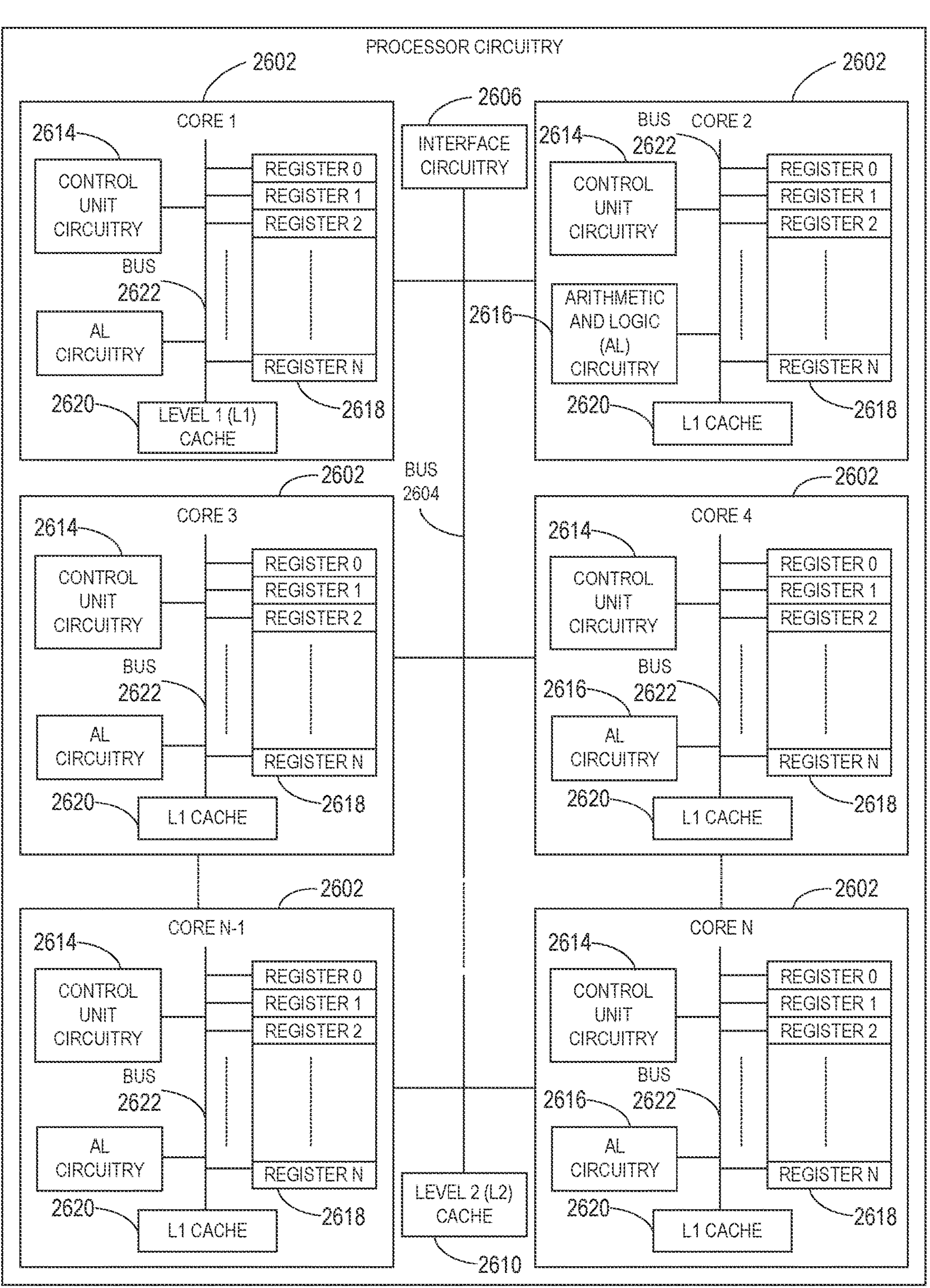
FIG. 26 is a block diagram of an example implementation of the processor circuitry of FIG. 25.

Each core 2602 may be referred to as a CPU, DSP, GPU, etc., or any other type of hardware circuitry. Each core 2602 includes control unit circuitry 2614, arithmetic and logic (AL) circuitry (sometimes referred to as an ALU) 2616, a plurality of registers 2618, the local memory 2620, and a second example bus 2622. Other structures may be present. For example, each core 2602 may include vector unit circuitry, single instruction multiple data (SIMD) unit circuitry, load/store unit (LSU) circuitry, branch/jump unit circuitry, floating-point unit (FPU) circuitry, etc. The control unit circuitry 2614 includes semiconductor-based circuits structured to control (e.g., coordinate) data movement within the corresponding core 2602. The AL circuitry 2616 includes semiconductor-based circuits structured to perform one or more mathematic and/or logic operations on the data within the corresponding core 2602. The AL circuitry 2616 of some examples performs integer based operations. In other examples, the AL circuitry 2616 also performs floating point operations. In yet other examples, the AL circuitry 2616 may include first AL circuitry that performs integer based operations and second AL circuitry that performs floating point operations. In some examples, the AL circuitry 2616 may be referred to as an Arithmetic Logic Unit (ALU). The registers 2618 are semiconductor-based structures to store data and/or instructions such as results of one or more of the operations performed by the AL circuitry 2616 of the corresponding core 2602. For example, the registers 2618 may include vector register(s), SIMD register(s), general purpose register(s), flag register(s), segment register(s), machine specific register(s), instruction pointer register(s), control register(s), debug register(s), memory management register(s), machine check register(s), etc. The registers 2618 may be arranged in a bank as shown in FIG. 26. Alternatively, the registers 2618 may be organized in any other arrangement, format, or structure including distributed throughout the core 2602 to shorten access time. The second bus 2622 may be implemented by at least one of an I2C bus, a SPI bus, a PCI bus, or a PCIe bus.

Each core 2602 and/or, more generally, the microprocessor 2600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 27:
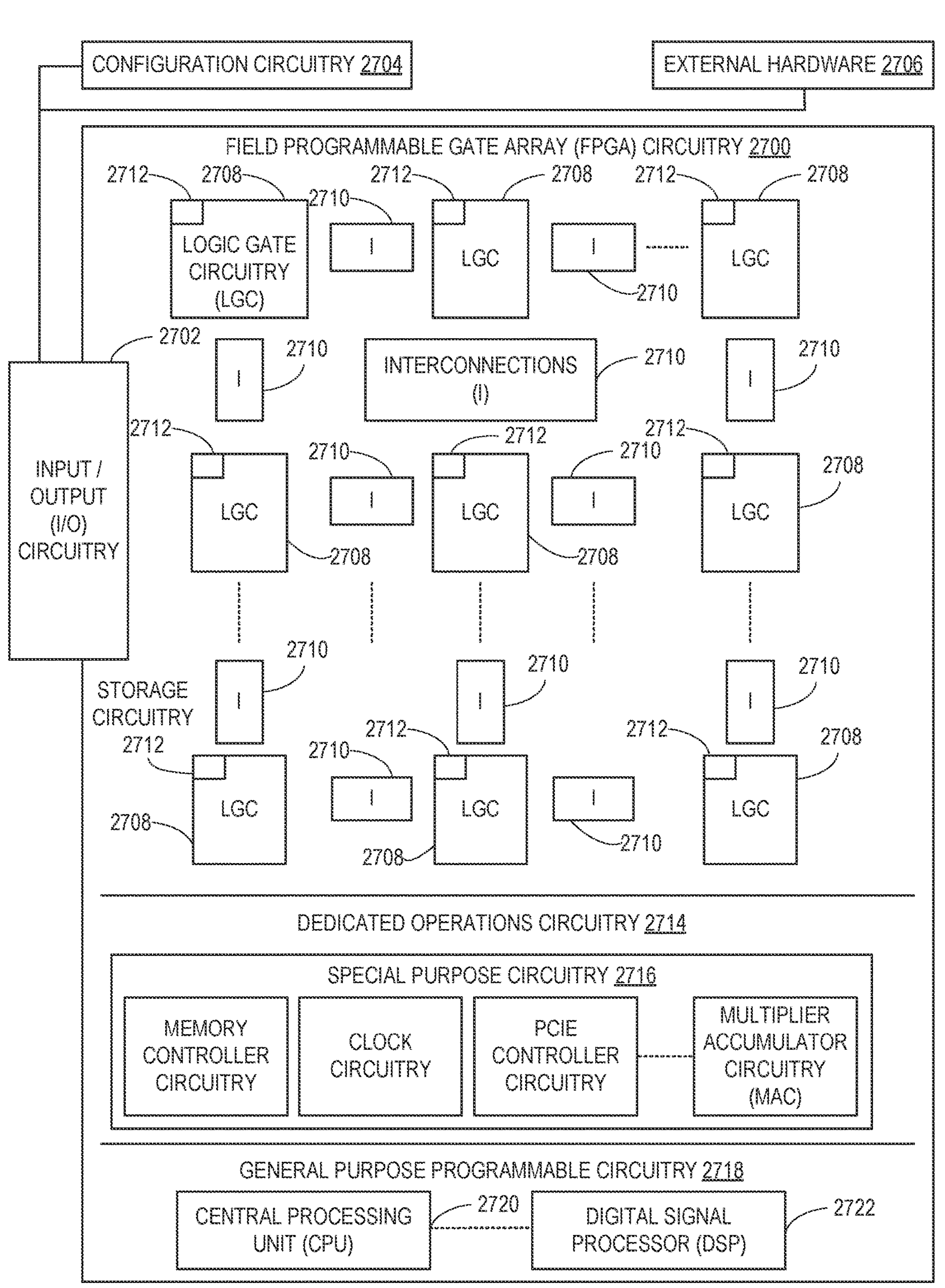
FIG. 27 is a block diagram of another example implementation of the processor circuitry of FIG. 25.

FIG. 27 is a block diagram of another example implementation of the processor circuitry 2512 of FIG. 25. In this example, the processor circuitry 2512 is implemented by FPGA circuitry 2700. For example, the FPGA circuitry 2700 may be implemented by an FPGA. The FPGA circuitry 2700 can be used, for example, to perform operations that could otherwise be performed by the example microprocessor 2600 of FIG. 26 executing corresponding machine readable instructions. However, once configured, the FPGA circuitry 2700 instantiates the machine readable instructions in hardware and, thus, can often execute the operations faster than they could be performed by a general purpose microprocessor executing the corresponding software.

More specifically, in contrast to the microprocessor 2600 of FIG. 26 described above (which is a general purpose device that may be programmed to execute some or all of the machine readable instructions disclosed here but whose interconnections and logic circuitry are fixed once fabricated), the FPGA circuitry 2700 of the example of FIG. 27 includes interconnections and logic circuitry that may be configured and/or interconnected in different ways after fabrication to instantiate, for example, some or all of the machine readable instructions disclosed herein. In particular, the FPGA circuitry 2700 may be thought of as an array of logic gates, interconnections, and switches. The switches can be programmed to change how the logic gates are interconnected by the interconnections, effectively forming one or more dedicated logic circuits (unless and until the FPGA circuitry 2700 is reprogrammed). The configured logic circuits enable the logic gates to cooperate in different ways to perform different operations on data received by input circuitry. Those operations may correspond to some or all of the software disclosed herein As such, the FPGA circuitry 2700 may be structured to effectively instantiate some or all of the machine readable instructions as dedicated logic circuits to perform the operations corresponding to those software instructions in a dedicated manner analogous to an ASIC. Therefore, the FPGA circuitry 2700 may perform the operations corresponding to the some or all of the machine readable instructions faster than the general purpose microprocessor can execute the same.

Figure 6:
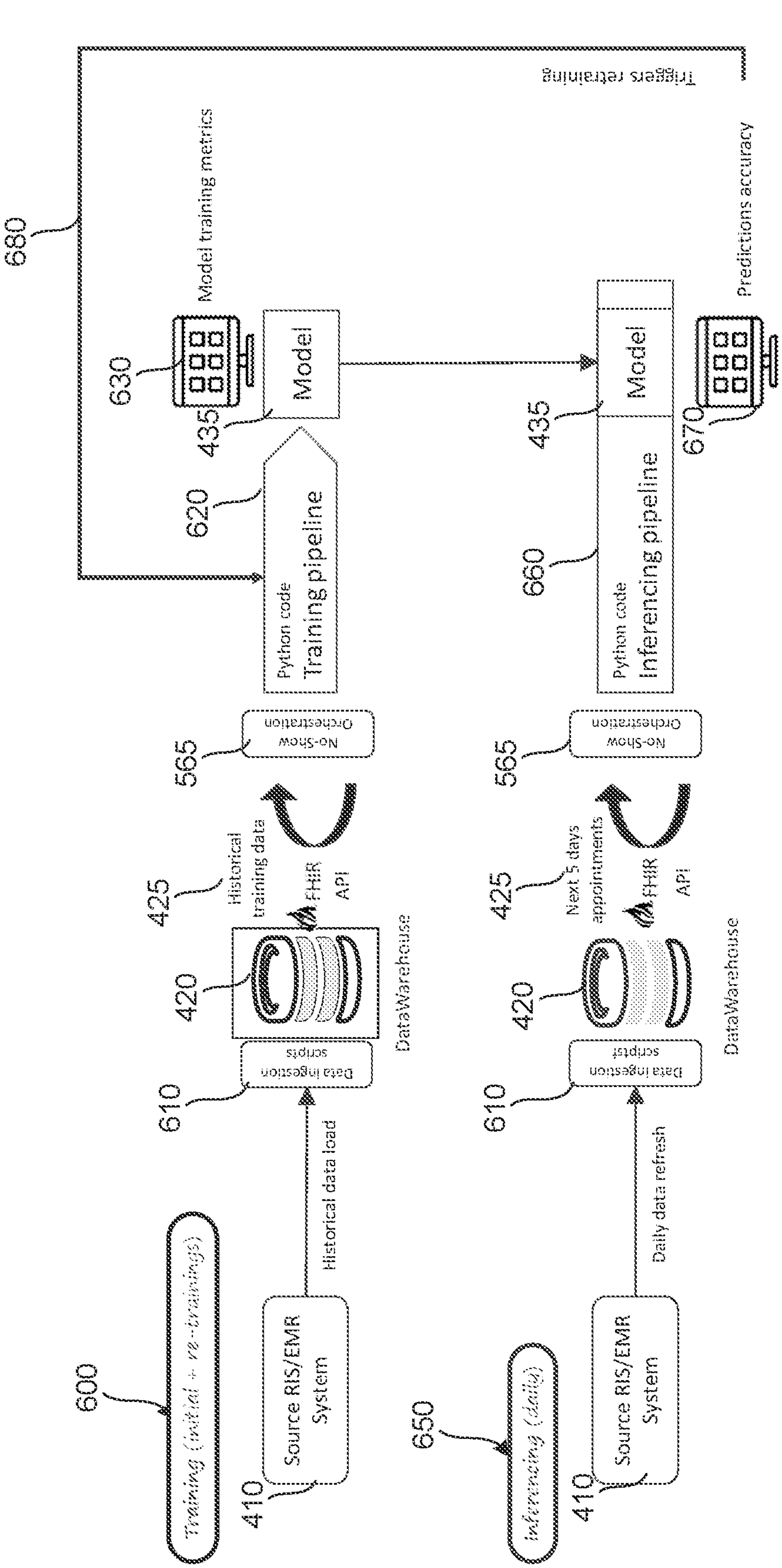
FIG. 6 shows example training and testing processes and associated pipelines for the AI model of FIGS. 1-5.

In the example of FIG. 6, the FPGA circuitry 2700 is structured to be programmed (and/or reprogrammed one or more times) by an end user by a hardware description language (HDL) such as Verilog. The FPGA circuitry 2700 of FIG. 27, includes example input/output (I/O) circuitry 2702 to obtain and/or output data to/from example configuration circuitry 2704 and/or external hardware 2706. For example, the configuration circuitry 2704 may be implemented by interface circuitry that may obtain machine readable instructions to configure the FPGA circuitry 2700, or portion(s) thereof. In some such examples, the configuration circuitry 2704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2706 may be implemented by external hardware circuitry. For example, the external hardware 2706 may be implemented by the microprocessor 2600 of FIG. 26. The FPGA circuitry 2700 also includes an array of example logic gate circuitry 2708, a plurality of example configurable interconnections 2710, and example storage circuitry 2712. The logic gate circuitry 2708 and the configurable interconnections 2710 are configurable to instantiate one or more operations that may correspond to at least some of the machine readable instructions and/or other desired operations. The logic gate circuitry 2708 shown in FIG. 27 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2708 to enable configuration of the electrical structures and/or the logic gates to form circuits to perform desired operations. The logic gate circuitry 2708 may include other electrical structures such as look-up tables (LUTs), registers (e.g., flip-flops or latches), multiplexers, etc.

The configurable interconnections 2710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2708 to program desired logic circuits.

The storage circuitry 2712 of the illustrated example is structured to store result(s) of the one or more of the operations performed by corresponding logic gates. The storage circuitry 2712 may be implemented by registers or the like. In the illustrated example, the storage circuitry 2712 is distributed amongst the logic gate circuitry 2708 to facilitate access and increase execution speed.

The example FPGA circuitry 2700 of FIG. 27 also includes example Dedicated Operations Circuitry 2714. In this example, the Dedicated Operations Circuitry 2714 includes special purpose circuitry 2716 that may be invoked to implement commonly used functions to avoid the need to program those functions in the field. Examples of such special purpose circuitry 2716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2700 may also include example general purpose programmable circuitry 2718 such as an example CPU 2720 and/or an example DSP 2722. Other general purpose programmable circuitry 2718 may additionally or alternatively be present such as a GPU, an XPU, etc., that can be programmed to perform other operations.

Although FIGS. 26 and 27 illustrate two example implementations of the processor circuitry 2512 of FIG. 25, many other approaches are contemplated. For example, as mentioned above, modern FPGA circuitry may include an on-board CPU, such as one or more of the example CPU 2720 of FIG. 27. Therefore, the processor circuitry 2512 of FIG. 25 may additionally be implemented by combining the example microprocessor 2600 of FIG. 26 and the example FPGA circuitry 2700 of FIG. 27. In some such hybrid examples, a first portion of the machine readable instructions may be executed by one or more of the cores 2602 of FIG. 26, a second portion of the machine readable instructions may be executed by the FPGA circuitry 2700 of FIG. 27, and/or a third portion of the machine readable instructions may be executed by an ASIC. It should be understood that some or all of the circuitry may, thus, be instantiated at the same or different times. Some or all of the circuitry may be instantiated, for example, in one or more threads executing concurrently and/or in series. Moreover, in some examples, some or all of the circuitry may be implemented within one or more virtual machines and/or containers executing on the microprocessor.

In some examples, the processor circuitry 2512 of FIG. 25 may be in one or more packages. For example, the microprocessor 2600 of FIG. 26 and/or the FPGA circuitry 2700 of FIG. 27 may be in one or more packages. In some examples, an XPU may be implemented by the processor circuitry 2512 of FIG. 25, which may be in one or more packages. For example, the XPU may include a CPU in one package, a DSP in another package, a GPU in yet another package, and an FPGA in still yet another package.

Figure 28:
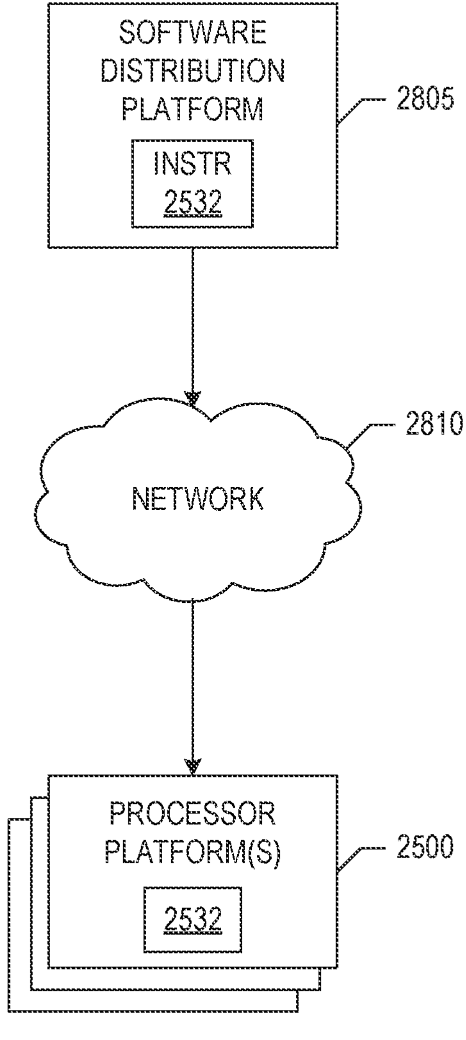
FIG. 28 is a block diagram of an example software distribution platform (e.g., one or more servers) to distribute software (e.g., software corresponding to example machine readable instructions) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2805 to distribute software such as the example machine readable instructions 2532 of FIG. 25 to hardware devices owned and/or operated by third parties is illustrated in FIG. 28. The example software distribution platform 2805 may be implemented by any computer server, data facility, cloud service, etc., capable of storing and transmitting software to other computing devices. The third parties may be customers of the entity owning and/or operating the software distribution platform 2805. For example, the entity that owns and/or operates the software distribution platform 2805 may be a developer, a seller, and/or a licensor of software such as the example machine readable instructions 2532 of FIG. 25. The third parties may be consumers, users, retailers, OEMs, etc., who purchase and/or license the software for use and/or re-sale and/or sub-licensing. In the illustrated example, the software distribution platform 2805 includes one or more servers and one or more storage devices. The storage devices store the machine readable instructions 432, which may correspond to the example machine readable instructions 2532 of FIG. 25, as described above. The one or more servers of the example software distribution platform 2805 are in communication with an example network 2810, which may correspond to any one or more of the Internet and/or any of the example networks described above. In some examples, the one or more servers are responsive to requests to transmit the software to a requesting party as part of a commercial transaction. In certain examples, access to the software can be regulated by the one or more servers of the software distribution platform and/or by a third party entity to authenticate and regulate authorized users, prevent unauthorized users from accessing and/or downloading the machine readable instructions 2532 from the software distribution platform 2805. For example, the software, which may correspond to the example machine readable instructions 2532 of FIG. 25, may be downloaded to the example processor platform 2500, which is to execute the machine readable instructions 2532 to implement the systems and methods described herein. In some examples, one or more servers of the software distribution platform 2805 periodically offer, transmit, and/or force updates to the software (e.g., the example machine readable instructions 2532) to ensure improvements, patches, updates, etc., are distributed and applied to the software at the end user devices.

In some examples, rather than downloading machine readable instructions 2532 to a local processor platform 2500, a deployed model and/or patient data can be uploaded to execute remotely via the cloud-based platform 2805. In some examples, the example platform 2805 can host one or more models, accessible by the network 2810, and a processor platform 2500 can provide input to the model and receive a result, prediction, and/or other output.

From the foregoing, it will be appreciated that example methods, apparatus and articles of manufacture have been disclosed that improve processing of data and associated documents. The disclosed methods, apparatus and articles of manufacture improve the efficiency of using a computing device and an interface being driven by the computing device by providing relevant documents in the context of a particular patient and exam order for display and interaction via a single interface. In certain examples, access to the larger set of documents is also maintained. Certain examples improve a computer system and its process and user interface display through the ability to apply filters in a manner previously unavailable. While prior approaches did not provide such matching and filtering and suffered from lack of granularity which results in loss of relevant data, computing performance issues, impact on patient safety, etc., certain examples alter the operation of the computing device and provide a new interface and document interaction. The disclosed methods, apparatus and articles of manufacture are accordingly directed to one or more improvement(s) in the functioning of a computer, as well as a new matching methodology and user interface layout, structure, and interaction for patient and exam information.

Further aspects of the present disclosure are provided by the subject matter of the following clauses:

Example 1 is an apparatus including: memory circuitry including instructions and a plurality of artificial intelligence (AI) models; and processor circuitry to execute the instructions to implement at least: a smart scheduling engine to train at least one of the plurality of AI models, update at least one of the plurality of AI models, and inference a prediction using at least one of the plurality of AI models; and a smart scheduling application programming interface (API) to facilitate interaction with at least one of the plurality of AI models to trigger the prediction and to configure resources for an appointment based on the prediction.

Example 2 includes the apparatus of any preceding clause, wherein the smart scheduling engine is implemented using at least one of a virtual machine or a container.

Example 3 includes the apparatus of any preceding clause, wherein the plurality of AI models are stored in at least one of a virtual machine or a container.

Example 4 includes the apparatus of any preceding clause, wherein the prediction includes at least one of a patient no show prediction, a patient late arrival prediction, a workload prediction, or a wait time prediction.

Example 5 includes the apparatus of any preceding clause, wherein the smart scheduling API includes a predictions inferencing API and a training API.

Example 6 includes the apparatus of any preceding clause, wherein the appointment and associated resources include a determined place, a determined time, determined staff, a determined device, a determined duration, and a determined exam.

Example 7 includes the apparatus of any preceding clause, wherein the smart scheduling engine is to import training data for the plurality of AI models from a source system.

Example 8 includes the apparatus of any preceding clause, wherein the smart scheduling engine is to generate a first prediction upon a request for the appointment and generate a second prediction prior to the appointment.

Example 9 includes the apparatus of any preceding clause, wherein the smart scheduling engine is to adjust the appointment based on the second prediction.

Example 10 includes the apparatus of any preceding clause, wherein the smart scheduling API is to drive a user interface to update the appointment and facilitate confirmation.

Example 11 includes at least one computer-readable storage medium including instructions which, when executed by at least one processor, cause the at least one processor to at least: train a plurality of artificial intelligence (AI) models; update at least one of the plurality of AI models; facilitate interaction with at least one of the plurality of AI models to trigger a prediction; inference the prediction using at least one of the plurality of AI models; and configure resources for an appointment based on the prediction.

Example 12 includes the at least one computer-readable storage medium of any preceding clause, wherein the prediction includes at least one of a patient no show prediction, a patient late arrival prediction, a workload prediction, or a wait time prediction.

Example 13 includes the at least one computer-readable storage medium of any preceding clause, wherein the interaction is facilitated using an application programming interface (API).

Example 14 includes the at least one computer-readable storage medium of any preceding clause, wherein the appointment and associated resources include resources allocated for a determined place, a determined time, determined staff, a determined device, a determined duration, and a determined exam.

Example 15 includes the at least one computer-readable storage medium of any preceding clause, wherein the instructions, when executed, cause the at least one processor to import training data for the plurality of AI models from a source system.

Example 16 includes the at least one computer-readable storage medium of any preceding clause, wherein the instructions, when executed, cause the at least one processor to generate a first prediction upon a request for an appointment and to generate a second prediction prior to the appointment.

Example 17 includes the at least one computer-readable storage medium of any preceding clause, wherein the instructions, when executed, cause the at least one processor to adjust the appointment based on the second prediction.

Example 18 includes the at least one computer-readable storage medium of any preceding clause, wherein the instructions, when executed, cause the at least one processor to display a user interface to update the appointment and facilitate confirmation.

Example 19 is a method including: training, by executing an instruction using processor circuitry, a plurality of artificial intelligence (AI) models; updating, by executing an instruction using the processor circuitry, at least one of the plurality of AI models; facilitating, using an application programming interface (API), interaction with at least one of the plurality of AI models to trigger a prediction; inferencing the prediction using at least one of the plurality of AI models; and configuring, using the API, resources for an appointment based on the prediction.

Example 20 includes the method of any preceding clause, wherein the prediction includes at least one of a patient no show prediction, a patient late arrival prediction, a workload prediction, or a wait time prediction, and wherein the appointment and associated resources include resources allocated for a determined place, a determined time, determined staff, a determined device, a determined duration, and a determined exam, and further including generating a first prediction upon a request for an appointment and to generate a second prediction prior to the appointment.

Example 21 is an apparatus including: means for training a plurality of artificial intelligence (AI) models; means for updating at least one of the plurality of AI models; means for facilitating, using an application programming interface (API), interaction with at least one of the plurality of AI models to trigger a prediction; means for inferencing the prediction using at least one of the plurality of AI models; and means for configuring, using the API, resources for an appointment based on the prediction.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:

memory circuitry including instructions and a plurality of artificial intelligence (AI) models; and processor circuitry to execute the instructions to implement at least:

a smart scheduling engine to train at least one of the plurality of AI models for patient care using training data comprising historical workflow data, appointment data, and non-healthcare data comprising weather and traffic information, host the plurality of AI models, update at least one of the plurality of AI models based on interaction with a patient, and inference a prediction using at least one of the plurality of AI models with patient data in response to a query, wherein the smart scheduling engine is to preprocess the training data by transforming healthcare data and the non-healthcare data into one or more features stored in a data cube and supplying the one or more features to the at least one AI model, and wherein the smart scheduling engine is to determine if the plurality of AI models are ready for deployment or whether one or more model weights are to be adjusted to improve an accuracy of the plurality of AI models, and wherein at least one of the plurality of AI models comprises a random forest model;

a smart scheduling application programming interface (API) to provide access to and interaction with at least one of the plurality of AI models to trigger the prediction; to allocate and configure, with a scheduler, resources for a location and a time with personnel for care of the patient in a scheduled appointment based on the prediction; and to output a notification of the appointment including the configuration of resources; and generate, using a virtual machine, an interactive dashboard comprising the notification of the appointment along with a confidence score and the configuration of the resources, wherein the configuration of the resources comprises a configuration of a medical imaging device for capturing imaging data during the appointment, the configuration comprising acquisition settings based on patient specific data determined prior to image capture;

execute a convolutional neural network-based image analysis operation to:

identify one or more objects of interest in the imaging data;

perform computer-aided diagnosis of the imaging data to identify a likely diagnosis; and schedule one or more additional medical imaging appointments for evaluation of the one or more objects of interest.

2. The apparatus of claim 1, wherein the smart scheduling engine is implemented using at least one of the virtual machine or a container.

3. The apparatus of claim 1, wherein the plurality of AI models are stored in at least one of the virtual machine or a container.

4. The apparatus of claim 1, wherein the prediction includes at least one of a patient no show prediction, a patient late arrival prediction, a workload prediction, or a wait time prediction.

5. The apparatus of claim 1, wherein the smart scheduling API includes a predictions inferencing API and a training API.

6. The apparatus of claim 1, wherein the appointment and associated resources include a determined place, a determined time, determined staff, a determined device, a determined duration, and a determined exam.

7. The apparatus of claim 1, wherein the smart scheduling engine is to import training data for the plurality of AI models from a source system.

8. The apparatus of claim 1, wherein the smart scheduling engine is to generate a first prediction upon a request for the appointment and generate a second prediction prior to the appointment.

9. The apparatus of claim 8, wherein the smart scheduling engine is to adjust the appointment based on the second prediction.

10. The apparatus of claim 9, wherein the smart scheduling API is to drive a user interface to update the appointment and facilitate confirmation.

11. At least one non-transitory computer-readable storage medium comprising instructions which, when executed by at least one processor, cause the at least one processor to at least:

train a plurality of artificial intelligence (AI) models for patient care using training data comprising historical workflow data, appointment data, and non-healthcare data comprising weather and traffic information; host the plurality of AI models;

update at least one of the plurality of AI models based on interaction with a patient, and preprocess the training data by transforming healthcare data and the non-healthcare data associated with the interaction into one or more features stored in a data cube and supply the one or more features to the at least one AI model, and wherein the updating comprises determining if the plurality of AI models are ready for deployment or whether one or more model weights are to be adjusted to improve an accuracy of the plurality of AI models, and wherein at least one of the plurality of AI models comprises a random forest model; provide an application programming interface (API) for interaction with at least one of the plurality of AI models to trigger a prediction for the patient in response to a query; inference the prediction using at least one of the plurality of AI models with patient data; allocate and configure, using the API and a scheduler, resources for a location and a time with personnel for care of the patient in a scheduled appointment based on the prediction; and output a notification of the appointment including the configuration of resources;

generate, using a virtual machine, an interactive dashboard comprising the notification of the appointment along with a confidence score and the configuration of the resources, wherein the configuration of the resources comprises a configuration of a medical imaging device for capturing imaging data during the appointment, the configuration comprising acquisition settings based on patient specific data determined prior to image capture; and execute a convolutional neural network-based image analysis operation to:

identify one or more objects of interest in the imaging data;

perform computer-aided diagnosis of the imaging data to identify a likely diagnosis; and schedule one or more additional medical imaging appointments for evaluation of the one or more objects of interest.

12. The at least one non-transitory computer-readable storage medium of claim 11, wherein the prediction includes at least one of a patient no show prediction, a patient late arrival prediction, a workload prediction, or a wait time prediction.

13. The at least one non-transitory computer-readable storage medium of claim 11, wherein the interaction is facilitated using an application programming interface (API).

14. The at least one non-transitory computer-readable storage medium of claim 11, wherein the appointment and associated resources include resources allocated for a determined place, a determined time, determined staff, a determined device, a determined duration, and a determined exam.

15. The at least one non-transitory computer-readable storage medium of claim 11, wherein the instructions, when executed, cause the at least one processor to import training data for the plurality of AI models from a source system.

16. The at least one non-transitory computer-readable storage medium of claim 11, wherein the instructions, when executed, cause the at least one processor to generate a first prediction upon a request for an appointment and to generate a second prediction prior to the appointment.

17. The at least one non-transitory computer-readable storage medium of claim 16, wherein the instructions, when executed, cause the at least one processor to adjust the appointment based on the second prediction.

18. The at least one non-transitory computer-readable storage medium of claim 17, wherein the instructions, when executed, cause the at least one processor to display a user interface to update the appointment and facilitate confirmation.

19. A method comprising:

training, by executing an instruction using processor circuitry, a plurality of artificial intelligence (AI) models;

updating, by executing an instruction using the processor circuitry, at least one of the plurality of AI models based on interaction with a patient using training data comprising historical workflow data, appointment data, and non-healthcare data comprising weather and traffic information; providing an application programming interface (API) for interaction with at least one of the plurality of AI models to trigger a prediction for the patient in response to a query, preprocessing the training data by transforming healthcare data and the non-healthcare data into one or more features stored in a data cube and supplying the one or more features to the at least one AI model, and determining if the plurality of AI models are ready for deployment or whether one or more model weights are to be adjusted to improve an accuracy of the plurality of AI models, and wherein at least one of the plurality of AI models comprises a random forest model; inferencing the prediction using at least one of the plurality of AI models with patient data; and configuring, using the API and a scheduler, resources for a location and a time with personnel for care of the patient in a scheduled appointment based on the prediction;

outputting a notification of the appointment including the configuration of resources;

generating, using a virtual machine, an interactive dashboard comprising the notification of the appointment including the configuration of the resources, wherein the configuration of the resources comprises a configuration of a medical imaging device for capturing imaging data during the appointment, the configuration comprising acquisition settings based on patient specific data determined prior to image capture, and executing a convolutional neural network-based image analysis operation to:

identify one or more objects of interest in the imaging data;

perform computer-aided diagnosis of the imaging data to identify a likely diagnosis; and schedule one or more additional medical imaging appointments for evaluation of the one or more objects of interest.

20. The method of claim 19, wherein the prediction includes at least one of a patient no show prediction, a patient late arrival prediction, a workload prediction, or a wait time prediction, and wherein the appointment and associated resources include resources allocated for a determined place, a determined time, determined staff, a determined device, a determined duration, and a determined exam, and further including generating a first prediction upon a request for an appointment and to generate a second prediction prior to the appointment.

* * * * *